(12) United States Patent
Yang

(10) Patent No.: US 12,220,639 B2
(45) Date of Patent: Feb. 11, 2025

(54) METHOD AND APPARATUS FOR CONTROLLING VIRTUAL OBJECT TO RESTORE ATTRIBUTE VALUE, TERMINAL, AND STORAGE MEDIUM

(71) Applicant: TENCENT TECHNOLOGY (SHENZHEN) COMPANY LIMITED, Shenzhen (CN)

(72) Inventor: Jinhao Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 211 days.

(21) Appl. No.: 17/886,457

(22) Filed: Aug. 12, 2022

(65) Prior Publication Data
US 2022/0379219 A1 Dec. 1, 2022

Related U.S. Application Data

(63) Continuation of application No. PCT/CN2021/099934, filed on Jun. 15, 2021.

(30) Foreign Application Priority Data

Jul. 24, 2020 (CN) .......................... 202010723108.9

(51) Int. Cl.
*A63F 13/58* (2014.01)
*A63F 13/837* (2014.01)

(52) U.S. Cl.
CPC ............ *A63F 13/58* (2014.09); *A63F 13/837* (2014.09)

(58) Field of Classification Search
CPC .... A63F 13/44–46; A63F 13/50; A63F 13/52; A63F 13/55–57; A63F 13/58; A63F 13/837
See application file for complete search history.

(56) References Cited

U.S. PATENT DOCUMENTS 10,057,318 B1 8/2018 Rashid et al.
11,179,637 B2 11/2021 Yang et al.
(Continued)

FOREIGN PATENT DOCUMENTS

CN 108579090 A 9/2018
CN 109806588 A 5/2019
(Continued)

OTHER PUBLICATIONS

China National Intellectual Property Administration (CNIPA) Office Action 1 for 202010723108.9, Jun. 4, 2021 8 Pages (including translation).
(Continued)

*Primary Examiner* — Omkar A Deodhar
(74) *Attorney, Agent, or Firm* — ANOVA LAW GROUP PLLC

(57) ABSTRACT

A method for controlling a virtual object to restore an attribute value includes: equipping the first virtual object with a skill restoration prop of at least one skill prop in response to a selection operation on the skill restoration prop, the skill restoration prop being configured to reduce an attribute value restoration delay; controlling, in response to a control operation on the first virtual object, the first virtual object to use a virtual prop against the second virtual object; and determining an attribute value restoration delay of the first virtual object within a preset period of time as a short target attribute value restoration delay according to the skill restoration prop in response to that the second virtual object is defeated by the first virtual object with the virtual prop, the target attribute value restoration delay being shorter than a default attribute value restoration delay.

20 Claims, 10 Drawing Sheets

(56) References Cited

U.S. PATENT DOCUMENTS

| | | | |
|---|---|---|---|
| 2012/0115605 A1* | 5/2012 | Watkins, Jr. | A63F 13/822 |
| | | | 463/32 |
| 2017/0216725 A1* | 8/2017 | Darley | A63F 13/69 |
| 2018/0278684 A1* | 9/2018 | Rashid | H04L 67/00 |
| 2019/0091574 A1 | 3/2019 | Wei | |
| 2019/0201789 A1* | 7/2019 | Yang | A63F 13/822 |
| 2020/0254347 A1* | 8/2020 | Wei | A63F 13/822 |
| 2020/0298123 A1* | 9/2020 | Yang | A63F 13/35 |
| 2021/0220742 A1 | 7/2021 | Yu | |

FOREIGN PATENT DOCUMENTS

| | | |
|---|---|---|
| CN | 110755841 A | 2/2020 |
| CN | 110860087 A | 3/2020 |
| CN | 111001158 A | 4/2020 |
| CN | 111013142 A | 4/2020 |
| CN | 111330277 A | 6/2020 |
| CN | 111714893 A | 9/2020 |

OTHER PUBLICATIONS

The World Intellectual Property Organization (WIPO) International Search Report for PCT/CN2021/099934 Sep. 15, 2021 6 Pages (including translation).

The First Hand Game Network, "List of Quick Healing Chip Effects in Call of Duty Mobile Games," 17173 Game Net, Dec. 16, 2019, Retrieved from the Internet:URL: http://news.17173.com/z/codm/content/12162019/115950632.shtml, [retrieved on Aug. 5, 2022] 8 pages.

* cited by examiner

METHOD AND APPARATUS FOR CONTROLLING VIRTUAL OBJECT TO RESTORE ATTRIBUTE VALUE, TERMINAL, AND STORAGE MEDIUM

CROSS-REFERENCES TO RELATED APPLICATIONS

This application is a continuation application of PCT Patent Application No. PCT/CN2021/099934, entitled "METHOD AND APPARATUS FOR CONTROLLING VIRTUAL OBJECT TO RECOVER ATTRIBUTE VALUE, AND TERMINAL AND STORAGE MEDIUM" and filed on Jun. 15, 2021, which claims priority to Chinese Patent Application No. 202010723108.9, filed with the China National Intellectual Property Administration on Jul. 24, 2020 and entitled "METHOD AND APPARATUS FOR CONTROLLING VIRTUAL OBJECT TO RESTORE ATTRIBUTE VALUE, TERMINAL, AND STORAGE MEDIUM", the entire contents of both of which are incorporated herein by reference.

FIELD OF THE TECHNOLOGY

The embodiments of the present disclosure relate to the field of computer technologies, and in particular, to restoring an attribute value of a virtual object.

BACKGROUND OF THE DISCLOSURE

A battle game is a game in which multiple user accounts compete in a same scenario. A player may control a virtual object in a virtual environment to perform an action such as walking, running, climbing, or shooting, and multiple players may team up online to complete a task in collaboration in a same virtual environment. In some cases, when an attribute value of a virtual object decreases, the attribute value may be automatically restored.

SUMMARY

Embodiments of the present disclosure provide a method and an apparatus for controlling a virtual object to restore an attribute value, a terminal, and a storage medium, to help a user to control a first virtual object to participate in a battle, improve the utilization of a virtual prop, effectively control duration of a single round, and reduce processing pressure of a server. The technical solutions are as follows:

According to one aspect, an embodiment of the present disclosure provides a method for controlling a virtual object to restore an attribute value. The method is applied to a virtual environment, the virtual environment includes a first virtual object and a second virtual object, and the first virtual object and the second virtual object belong to different camps. The method includes: equipping the first virtual object with a skill restoration prop in response to a selection operation on the skill restoration prop, the skill restoration prop being configured to reduce an attribute value restoration delay, wherein the attribute value restoration delay indicates that when an attribute value of a virtual object decreases and does not decrease again within the attribute value restoration delay, the virtual object enters a restoration state in which the attribute value is automatically restored; controlling, in response to a control operation on the first virtual object, the first virtual object to use a virtual prop against the second virtual object, the virtual prop being configured to change an attribute value of the second virtual object; and determining the attribute value restoration delay of the first virtual object as a target attribute value restoration delay within a preset period of time according to the skill restoration prop in response to that the second virtual object is defeated by the first virtual object with the virtual prop, the target attribute value restoration delay being shorter than a default attribute value restoration delay.

According to another aspect, an embodiment of the present disclosure provides an apparatus for controlling a virtual object to restore an attribute value. The apparatus is applied to a virtual environment, the virtual environment includes a first virtual object and a second virtual object, and the first virtual object and the second virtual object belong to different camps. The apparatus includes: a processor and a memory, the memory stores at least one instruction and at least one program, code set, or instruction set, and the at least one instruction and the at least one program, code set, or instruction set is loaded and executed by the processor to implement: equipping the first virtual object with a skill restoration prop in response to a selection operation on the skill restoration prop, the skill restoration prop being configured to reduce an attribute value restoration delay, wherein the attribute value restoration delay indicates that when an attribute value of a virtual object decreases and does not decrease again within the attribute value restoration delay, the virtual object enters a restoration state in which the attribute value is automatically restored; controlling, in response to a control operation on the first virtual object, the first virtual object to use a virtual prop against the second virtual object, the virtual prop being configured to change an attribute value of the second virtual object; and determining the attribute value restoration delay of the first virtual object as a target attribute value restoration delay within a preset period of time according to the skill restoration prop in response to that the second virtual object is defeated by the first virtual object with the virtual prop, the target attribute value restoration delay being shorter than a default attribute value restoration delay.

According to another aspect, an embodiment of the present disclosure provides a non-transitory computer-readable storage medium. The computer-readable storage medium is configured to store a computer program, and the computer program is configured to execute the method for controlling a virtual object to restore an attribute value according to the above aspect.

According to an aspect of the present disclosure, a computer program product or a computer program is provided, the computer program product or the computer program including computer instructions, the computer instructions being stored in a computer-readable storage medium. A processor of a terminal reads the computer instruction from the computer-readable storage medium, and executes the computer instruction to cause the terminal to execute the method for controlling a virtual object to restore an attribute value according to various example embodiments of the above aspect.

The technical solutions provided in the embodiments of the present disclosure achieve at least the following beneficial effects:

In the embodiments of the present disclosure, when the skill restoration prop is equipped, the attribute value restoration delay is reduced by defeating the second virtual object with the virtual prop, so that the attribute value of the first virtual object can be restored in time. This avoids that after the user controls the first virtual object to defeat the second virtual object, the first virtual object is defeated by other virtual objects because the first virtual object cannot defend or restore the attribute value in time. This can help a user to control the first virtual object to participate in a battle, improve the utilization of the virtual prop, effectively control duration of a single round, and reduce processing pressure of a server.

DESCRIPTION OF EMBODIMENTS

Figure 1:
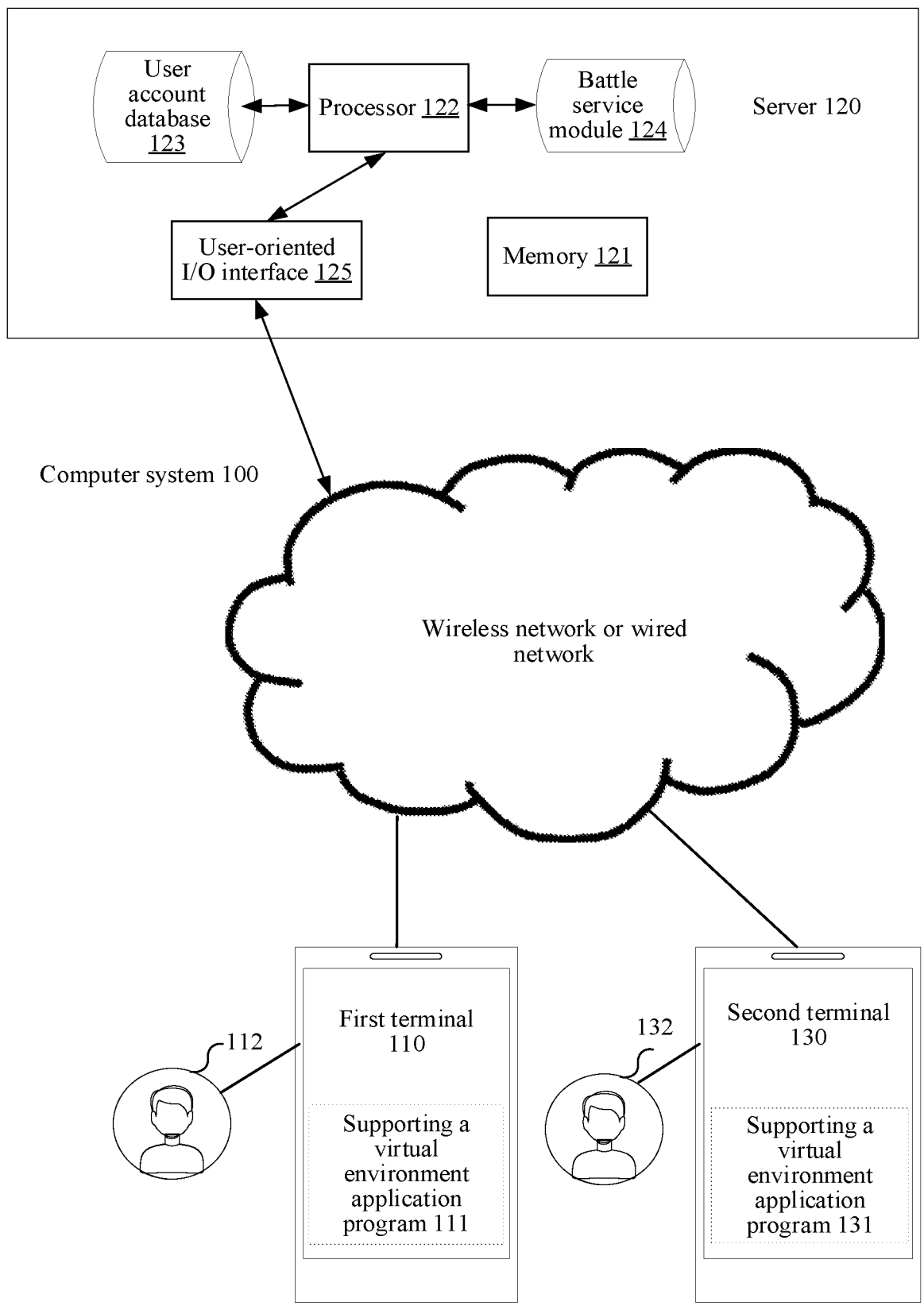
FIG. 1 is a schematic diagram of an implementation environment according to an exemplary embodiment of the present disclosure.

To make objectives, technical solutions, and advantages of the present disclosure clearer, the following further describes implementations of the present disclosure in detail with reference to the accompanying drawings.

"Plurality of" mentioned in the specification means two or more. And/or describes an association relationship between associated objects and means that three relationships may exist. For example, A and/or B may represent the following three cases: Only A exists, both A and B exist, and only B exists. The character "/" in this specification generally indicates an "or" relationship between the associated objects.

First, terms involved in the embodiments of the present disclosure are introduced:

A virtual environment is a virtual environment displayed (or provided) by an application when run on a terminal. The virtual environment may be a simulated environment of a real world, or may be a semi-simulated semi-fictional environment, or may be an entirely fictional environment. The virtual environment may be any one of a two-dimensional virtual environment, a 2.5-dimensional virtual environment, and a 3D virtual environment. This is not limited in the present disclosure. A description is made by using an example in which the virtual environment is a 3D virtual environment in the following embodiments.

A virtual object is a movable object in the virtual environment. The movable object may be a virtual person, a virtual animal, a cartoon person, or the like, such as a person, an animal, a plant, an oil drum, a wall, a stone, or the like displayed in a three-dimensional virtual environment. In some embodiments, the virtual object is a three-dimensional model created based on a skeletal animation technology. Each virtual object has a respective shape and size in the three-dimensional virtual environment, and occupies some space in the three-dimensional virtual environment.

A first-person shooting (FPS) game is a shooting game in which a user can play in a first-person perspective. A virtual environment picture in the game is a picture of a virtual environment observed with a perspective of a virtual object. In the game, at least two virtual objects play in a single-round battle mode in the virtual environment. The virtual object eludes damages from other virtual objects and dangers (for example, a poison gas area and a swamp) in the virtual environment to survive in the virtual environment. When a health point of the virtual object in the virtual environment is zero, the life of the virtual object in the virtual environment ends, and the final virtual object surviving in the virtual environment wins. In some embodiments, the battle starts with a moment when the first client joins the battle, and ends with a moment when the last client exits the battle. Each client may control one or more virtual objects in the virtual environment. In some embodiments, arena modes of the battle may include a single-player battle mode, a two-player team battle mode, or a multi-player team battle mode. The battle mode is not limited in the embodiments of the present disclosure.

Virtual prop: A virtual prop is a prop that may be used by a virtual object in a virtual environment, including a virtual weapon that can change an attribute value of another virtual object, a skill prop that can increase skills or attributes for the virtual object, a supply prop such as a bullet, a defensive prop such as a shield, an armor, or an armored vehicle, a virtual prop displayed by the virtual object with a hand to release a skill such as a virtual beam or a virtual shock wave, and some body parts of the virtual object such as a hand and a leg. The virtual prop that can change an attribute value of another virtual object includes a long-distance virtual prop such as a pistol, a rifle, or a sniper rifle, a short-range virtual prop such as a dagger, a knife, a sword, or a rope, and a throwing virtual prop such as a flying ax, a flying knife, a grenade, a flash bomb, or a smoke bomb. In some embodiments, the virtual prop in the embodiments of the present disclosure refers to a prop equipped by the virtual object by default.

A user interface (UI) control is any visible control or element that can be seen on a user interface of an application program, for example, controls such as a picture, an input box, a text box, a button, or a label, where some UI controls respond to an operation of a user.

The method provided in the present disclosure may be applied to a virtual reality (VR) application, a 3D map program, a military simulation program, an FPS game, a multiplayer online battle arena game (MOBA), and the like. An application during a game is used as an example for description in the following embodiments.

A game based on a virtual environment is usually formed by maps of one or more game worlds. The virtual environment in the game simulates scenarios in the real world. A user may control a virtual object in the game to perform actions such as walking, running, jumping, shooting, combat, driving, switching to use a virtual prop, and using a virtual prop to cause damage to another virtual object, which has relatively high interactivity. In addition, a plurality of users may form a team online to perform an arena game. Generally, if an attribute value of a first virtual object decreases and the first virtual object is not defeated, the attribute value of the first virtual object is automatically restored at a particular speed after a period of time. However, there is a delay in automatic restoration of the attribute value, that is, from a moment at which the attribute value decreases, the attribute value of the first virtual object starts to be automatically restored only when an attribute value restoration delay is reached. If the attribute value decreases again subsequently, timing is restarted.

If the attribute value restoration method in the related art is used, the first virtual object is easily exposed when attacking the second virtual object. Especially when there is a virtual object nearby in a same camp as the second virtual object, the first virtual object is easily attacked when attacking the second virtual object. When a user cannot operate and control the first virtual object to defend or restore the attribute value in time, the first virtual object is easily defeated. Therefore, some users participate in the game through hiding and squatting. As a result, the utilization of a short-distance virtual prop and a throwing virtual prop is low, duration of a single round cannot be effectively controlled, and the burden on a server is increased. To solve the problem in the related art, in one embodiment, a method for controlling a virtual object to restore an attribute value in the embodiments of the present disclosure provides a skill restoration prop, and a user equips the first virtual object with the skill restoration prop before a game starts. Therefore, the first virtual object can rapidly restore the attribute value after defeating the second virtual object, thereby helping the user to control the first virtual object to participate in the game, and improving the utilization of a short-distance virtual prop and a throwing virtual prop.

FIG. 1 is a schematic diagram of an implementation environment according to an embodiment of the present disclosure. The implementation environment may include a first terminal 110, a server 120, and a second terminal 130.

An application program 111 supporting a virtual environment is installed and run on the first terminal 110, and the application program 111 may be a multiplayer online battle program. When the first terminal runs the application program 111, a UI of the application program 111 is displayed on a screen of the first terminal 110. The application program 111 may be any one of a military simulation program, a MOBA game, an escape shooting game, and a simulation game (SLG). In this embodiment, for example, the application program 111 is an FPS game. The first terminal 110 is a terminal used by a first user 112. The first user 112 uses the first terminal 110 to control a first virtual object located in the virtual environment to perform activities, and the first virtual object may be referred to as a master virtual object of the first user 112. The activities of the first virtual object include, but are not limited to: at least one of adjusting body postures, crawling, walking, running, riding, jumping, driving, picking, shooting, attacking, throwing, and casting an ability. For example, the first virtual object is a first virtual person, such as a simulated person or a cartoon person.

An application program 131 supporting the virtual environment is installed and run on the second terminal 130, and the application program 131 may be a multiplayer online battle program. When the second terminal 130 runs the application program 131, a UI of the application program 131 is displayed on a screen of the second terminal 130. The client may be any one of a military simulation program, a MOBA game, an escape shooting game, and a simulation game (SLG). In this embodiment, for example, the application program 131 is an FPS game. The second terminal 130 is a terminal used by a second user 132. The second user 132 uses the second terminal 130 to control a second virtual object located in the virtual environment to perform activities, and the second virtual object may be referred to as a master virtual object of the second user 132. For example, the second virtual object is a second virtual person, such as a simulated person or a cartoon person.

In some embodiments, the first virtual object and the second virtual object are located in the same virtual world. In some embodiments, the first virtual object and the second virtual object may belong to the same camp, the same team, or the same organization, have a friend relationship with each other, or have a temporary communication permission. In some embodiments, the first virtual object and the second virtual object may belong to different camps, different teams, or different organizations, or have a hostile relationship with each other.

In some embodiments, the application programs installed on the first terminal 110 and the second terminal 130 are the same, or the application programs installed on the two terminals are the same type of application programs in different operating system platforms (for example, Android or IOS). The first terminal 110 may generally refer to one of a plurality of terminals, and the second terminal 130 may generally refer to another one of a plurality of terminals. In this embodiment, only the first terminal 110 and the second terminal 130 are used as an example for description. The first terminal 110 and the second terminal 130 are of the same or different device types, the device type comprising at least one of a smartphone, a tablet computer, an e-book reader, an MP3 player, an MP4 player, a laptop, and a desktop computer.

Only two terminals are shown in FIG. 1, but multiple other terminals can access the server 120 in different embodiments. In some embodiments, the one or more terminals may be a terminal corresponding to a developer. A platform for developing and editing the application program supporting the virtual environment is installed on the terminal. A developer can edit and update the application program on the terminal and transmit an updated application program package to the server 120 through a wired or wireless network. The first terminal 110 and the second terminal 130 can download the application program package from the server 120 to update the application program.

The first terminal 110, the second terminal 130, and the another terminal are connected to the server 120 through a wireless network or a wired network.

The server 120 includes at least one of one server, a server cluster including a plurality of servers, a cloud computing platform, and a virtualization center. The server 120 is configured to provide a backend service for an application supporting a 3D virtual environment. In some embodiments, the server 120 is responsible for primary computing work, and the terminal is responsible for secondary computing work; or the server 120 is responsible for secondary computing work, and the terminal is responsible for primary computing work; or a distributed computing architecture is used for collaborative computing between the server 120 and the terminal.

In a schematic example, the server cluster 120 includes a memory 121, a processor 122, a user account database 123, a battle service module 124, and a user-oriented input/output (I/O) interface 125. The processor 122 is configured to load instructions stored in the server 120, and process data in the user account database 123 and the battle service module 124. The user account database 123 is configured to store data of user accounts used by the first terminal 110, the second terminal 130, and the another terminal, for example, avatars of the user accounts, nicknames of the user accounts, battle effectiveness indexes of the user accounts, and service zones of the user accounts. The battle service module 124 is configured to provide a plurality of battle rooms for the users to battle, for example, a 1V1 battle room, a 3V3 battle room, a 5V5 battle room, and the like. The user-oriented I/O interface 125 is configured to establish communication between the first terminal 110 and/or the second terminal 130 by using a wireless network or a wired network for data exchange.

Figure 2:
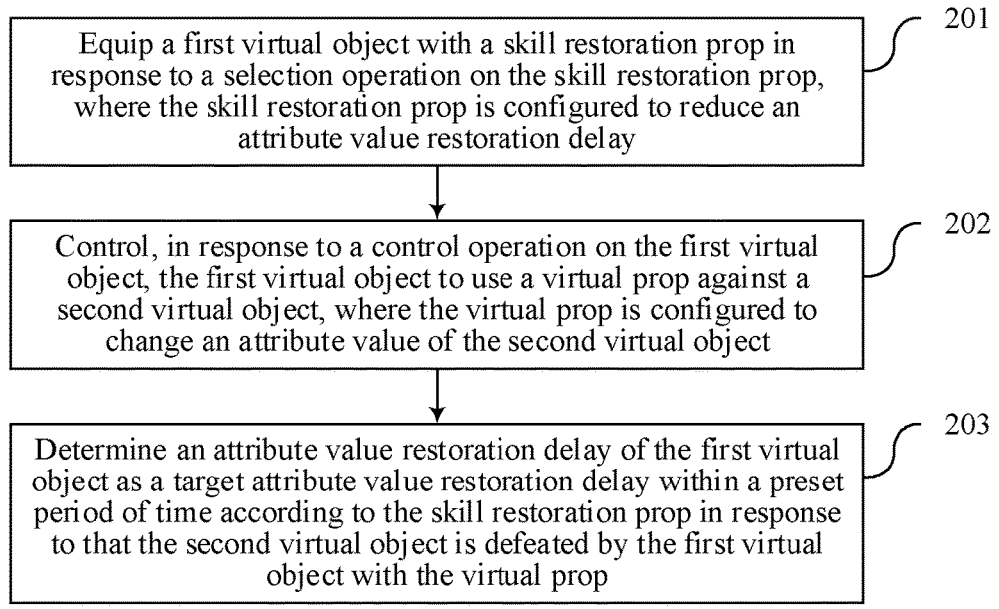
FIG. 2 is a flowchart of a method for controlling a virtual object to restore an attribute value according to an exemplary embodiment of the present disclosure.

FIG. 2 is a flowchart of a method for controlling a virtual object to restore an attribute value according to an exemplary embodiment of the present disclosure. In this embodiment, a description is made by using an example in which the method is applicable to the first terminal 110 or the second terminal 130 in the implementation environment shown in FIG. 1 or the another terminal in the implementation environment, and the method includes the following steps:

Step 201: Equip the first virtual object with a skill restoration prop in response to a selection operation on the skill restoration prop, where the skill restoration prop is configured to reduce an attribute value restoration delay.

When an attribute value of a virtual object decreases and does not decrease again within the attribute value restoration delay, the virtual object enters an attribute value automatic restoration state. the attribute value restoration delay indicates a timing of the virtual object entering the restoration state, which is when the attribute value of a virtual object decreases and does not decrease again within the attribute value restoration delay. For example, the attribute value restoration delay is a count-down time period since the virtual object gets hurt until the virtual object starts automatic healing. In other words, an attribute value restoration delay indicates a time period that begins at a time when the attribute value of the virtual object decreases and ends at a time when the virtual object enters the state in which the attribute value is automatically restored. Further, within the time period defined by the attribute value restoration delay, the attribute value of the virtual object does not decrease again. In some embodiments, if the attribute value of the virtual object decreases again before the time period of the attribute value restoration delay ends, the system may restart the clock for counting the time period of the attribute value restoration delay.

The method in this embodiment of the present disclosure is applied to a virtual environment, the virtual environment includes a first virtual object and a second virtual object, and the first virtual object and the second virtual object belong to different camps. In one embodiment, the terminal displays the virtual environment in a virtual environment image. In some embodiments, the virtual environment image is a picture of the virtual environment observed from a perspective of the virtual object. A perspective refers to an observation angle for observation from a first-person perspective or a third-person perspective of a virtual character in a virtual environment. In some embodiments, in the embodiments of the present disclosure, the perspective is an angle for observing the virtual character by using a camera model in the virtual environment.

In some embodiments, the camera model automatically follows the virtual character in the virtual environment. That is, when a position of the virtual character in the virtual environment changes, a position of the camera model following the virtual character in the virtual environment changes simultaneously, and the camera model is always within a preset distance range from the virtual character in the virtual environment. In some embodiments, in the automatic following process, relative positions of the camera model and the virtual character remain unchanged.

The camera model is a three-dimensional model located around a virtual object in the virtual environment. When a first-person perspective is used, the camera model is located near the head of the virtual object or is located on the head of the virtual object. When a third-person perspective is used, the camera model may be located behind a virtual object and bound to the virtual object, or may be located at any location with a preset distance from the virtual object. The camera model may be used to observe the virtual object in the virtual environment from different angles. In some embodiments, when the third-person perspective is a first-person over-shoulder perspective, the camera model is located behind the virtual character (for example, the head and the shoulders of a virtual person). In some embodiments, in addition to the first-person perspective and the third-person perspective, there are also other perspectives, such as a top view perspective. When the top view perspective is used, the camera model may be located above the head of the virtual object, and the top view perspective is a perspective for observing the virtual environment from above. In some embodiments, the camera model is not actually displayed in the virtual environment. In other words, the camera model is not displayed in the virtual environment displayed in the UI.

Description is made by using an example in which the camera model is located at any position at a preset distance from the virtual object. In some embodiments, one virtual object corresponds to one camera model, and the camera model may rotate with the virtual object as a rotation center. For example, the camera model is rotated with any point of the virtual object as the rotation center. During rotation, the camera model is not only rotated, but also displaced. During rotation, a distance between the camera model and the rotation center remains unchanged, that is, the camera model is rotated on a surface of a sphere with the rotation center as a sphere center. Any point of the virtual character may be the head or the torso of the virtual object, or any point around the virtual object. This is not limited in the embodiments of the present disclosure. In some embodiments, when the camera model observes the virtual object, a center of the perspective of the camera model points to a direction from a point on the spherical surface at which the camera model is located to the sphere center.

In some embodiments, the camera model may alternatively observe the virtual object at a preset angle in different directions of the virtual object. In some embodiments, the first virtual object is a virtual object controlled by a user through a terminal, the second virtual object includes at least one of a virtual object controlled by another user and a virtual object controlled by a backend server, and the first virtual object and the second virtual object belong to different camps.

In some embodiments, the virtual environment image in this embodiment of the present disclosure is an image for observing the virtual environment from the perspective of the first virtual object.

Figure 4:
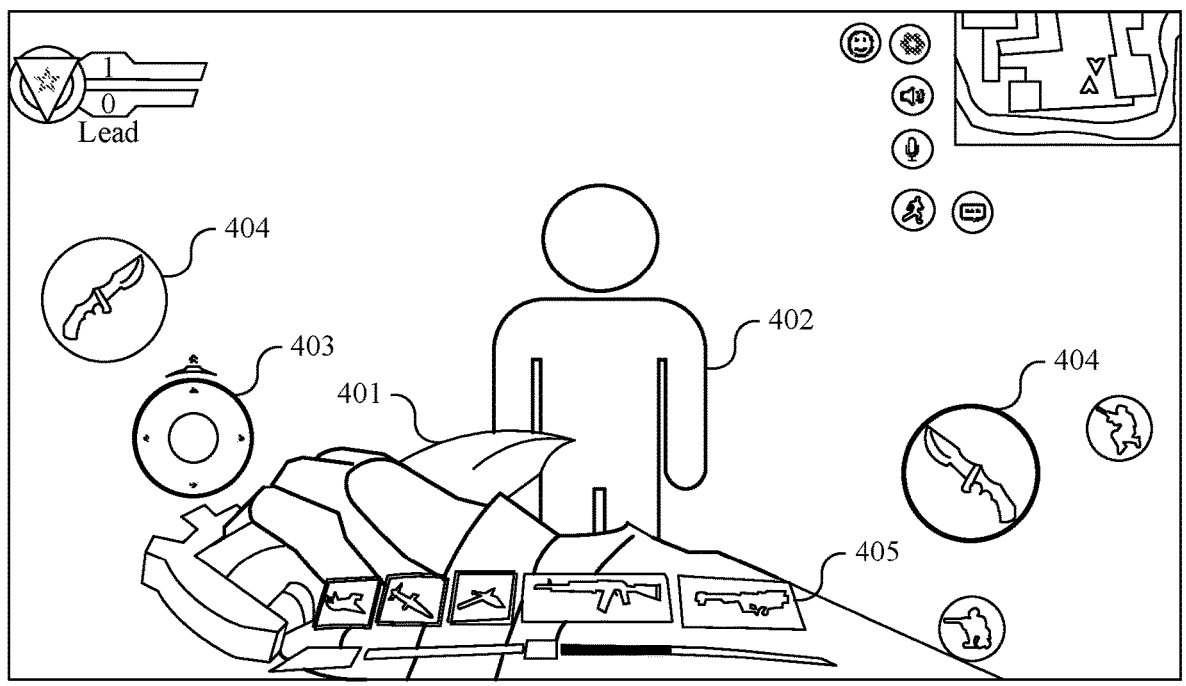
FIG. 4 is a schematic diagram of controlling a first virtual object to use a virtual prop against a second virtual object according to an exemplary embodiment of the present disclosure.

For example, as shown in FIG. 4, the virtual environment image on the user interface is an image in which the first virtual object observes from the first-person perspective. In addition to the virtual environment, the image also includes a virtual prop 401 that the virtual object is currently equipped with (that is, holds) and the second virtual object 402.

In some embodiments, the virtual environment includes at least one of the following elements: a mountain, a plain, a river, a lake, a sea, a desert, sky, a plant, a building, and a vehicle.

In some embodiments, in addition to the virtual environment image, the virtual environment interface also includes UI controls such as an input box, a text box, and a button.

In one embodiment, before displaying the virtual environment interface, the terminal first displays a skill prop equipment interface, where the skill prop equipment interface includes a prop selection control for at least one skill prop. When the terminal receives a selection operation on a prop selection control of a target skill prop, it is determined that the first virtual object is equipped with the target skill prop.

In one embodiment, when the attribute value of the first virtual object is lower than a threshold, the attribute value may be automatically restored at a particular speed, but the attribute value corresponds to a default attribute value restoration delay. For example, when the first virtual object is damaged, a life value is reduced. When a life value restoration delay is reached, the life value starts to be automatically restored. If the first virtual object is damaged again before the life value restoration delay is reached or in a restoration process of the life value, a life value decrease moment is determined again, that is, the life value restoration delay is a time interval between the latest life value decrease moment and an automatic restoration moment of the life value.

To avoid that when the user controls the first virtual object to damage the second virtual object, the restoration process of the attribute value is interrupted by another virtual object and the user cannot take measures in time (for example, control the first virtual object to move to a safe region or use a special virtual prop to restore the attribute value), which increases a probability that the first virtual object is defeated, in one embodiment, an embodiment of the present disclosure provides a skill restoration prop. If the first virtual object is equipped with the skill restoration prop, the attribute value restoration delay can be reduced when a particular condition is met.

In some embodiments, the terminal displays a skill prop equipment interface before entering the game, or displays a skill prop equipment interface when the game starts and the first virtual object has not attacked the second virtual object.

In some embodiments, the first virtual object may be equipped with a predetermined number of skill props in one game. After the first virtual object is equipped with a skill prop, the first virtual object always has an attribute or a skill of the corresponding skill prop in a subsequent single game.

Figure 3:
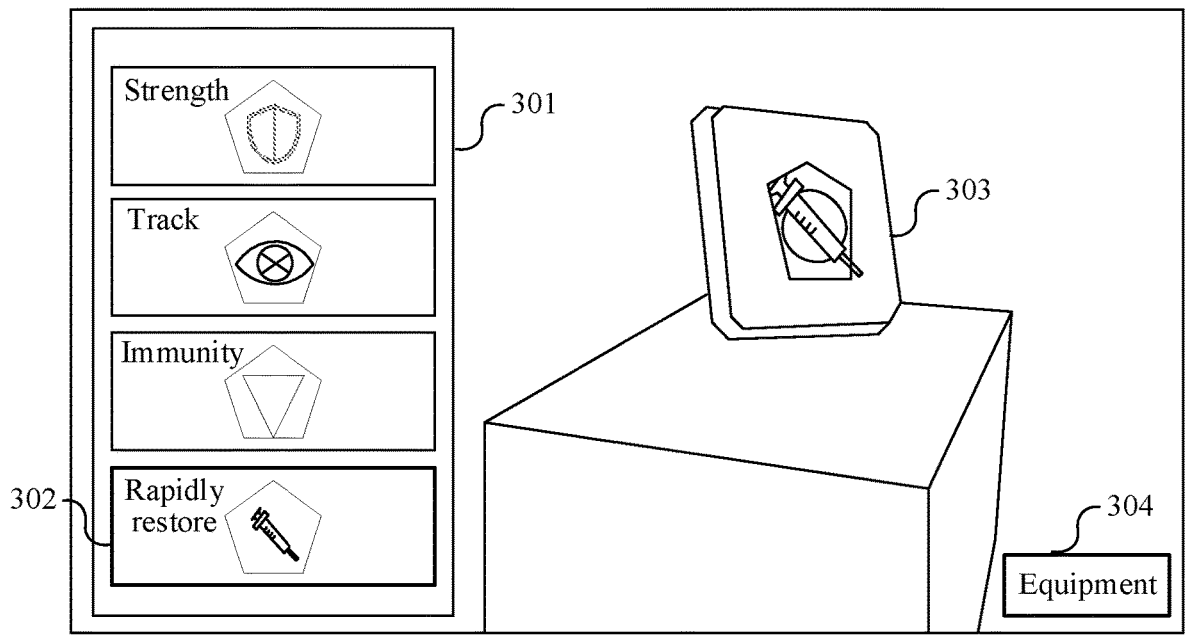
FIG. 3 is a schematic diagram of an interface of skill prop equipment according to an exemplary embodiment of the present disclosure.

Illustratively, FIG. 3 is a schematic diagram of a skill prop equipment interface. The skill prop equipment interface includes a skill prop selection column 301, which includes skill props owned by the first virtual object corresponding to a current account.

In one embodiment, because the skill restoration prop changes the attribute value restoration delay of the first virtual object and calculation related to the restoration of the attribute value is performed by a server, when the terminal receives the selection operation on the skill restoration prop, the terminal sends a prop equipment instruction to the server.

In some embodiments, the first virtual object may be equipped with multiple skill props at the same time, and the prop equipment instruction includes all the skill props that the first virtual object is equipped with. The server creates the first virtual object in the virtual environment according to the prop equipment instruction, and equips the first virtual object with the skill restoration prop and other skill props indicated by the prop equipment instruction.

Illustratively, as shown in FIG. 3, when the terminal receives a triggering operation on the skill restoration prop, such as a selection control 302 for rapid restoration, the terminal displays the skill restoration prop 303 and introduction of the prop on the skill prop equipment interface. When a triggering operation on an equipment control 304 is received, it is determined that the selection operation for the skill restoration prop is received, and the prop equipment instruction is sent to the server.

Step 202: Control, in response to a control operation on the first virtual object, the first virtual object to use a virtual prop against the second virtual object, where the virtual prop is configured to change an attribute value of the second virtual object.

In one embodiment, the user controls the first virtual object to use the virtual prop against the second virtual object by performing a triggering operation on a control on the virtual environment interface. The virtual prop is configured to change the attribute value of the second virtual object, for example, change a life value, a spell value, an energy value, and field of view of the second virtual object.

In some embodiments, different types of virtual props are used to change different attribute values of the second virtual object.

Illustratively, as shown in FIG. 4, when receiving a touch operation on a direction control 403, the terminal controls the first virtual object to move in the virtual environment, when receiving a touch operation on an attack control 404, the terminal controls the first virtual object to use the virtual prop 401, and when receiving a touch operation on a prop selection control 405, the terminal switches the virtual prop 401. The user controls the first virtual object to use the virtual prop 401 against the second virtual object 402 by controlling the direction control 403 and the attack control 404.

Step 203: Determine an attribute value restoration delay of the first virtual object as a target attribute value restoration delay within a preset period of time according to the skill restoration prop in response to that the second virtual object is defeated by the first virtual object with the virtual prop.

The target attribute value restoration delay is shorter than a default attribute value restoration delay.

In one embodiment, if the first virtual object is equipped with the skill restoration prop, when the first virtual object uses the virtual prop to defeat the second virtual object, the terminal determines the target attribute value restoration delay of the first virtual object within the preset period of time. The target attribute value restoration delay is shorter than the default attribute value restoration delay corresponding to the attribute value. When the preset period of time in which the attribute value restoration delay of the first virtual object is determined as the target attribute value restoration delay is reached, and the first virtual object does not use the virtual prop to defeat the second virtual object again within the preset period of time, the attribute value restoration delay of the first virtual object is restored to the default attribute value restoration delay.

Illustratively, the preset period of time is 1 minute. Within 1 minute after the first virtual object uses a virtual weapon to defeat the second virtual object, the attribute value restoration delay of the first virtual object is the target attribute value restoration delay. The target attribute value restoration delay is shorter than the default attribute value restoration delay. For example, the default attribute value restoration delay is 10 s, and the target attribute value restoration delay is 2 s.

In some embodiments, when the first virtual object uses the virtual prop to reduce the life value of the second virtual object to a life threshold, it is determined that the second virtual object is defeated by the first virtual object with the virtual prop.

In some embodiments, target attribute value restoration delays corresponding to different virtual props are different.

Illustratively, the first virtual object is equipped with the skill restoration prop, and a preset life value restoration delay of the first virtual object is 5 s. When the first virtual object uses the virtual prop to defeat the second virtual object, the terminal determines that a target life value restoration delay is 2 s.

Illustratively, a time length identified by the target attribute value restoration delay may be 0. This is equivalent to enabling the first virtual object to directly enter the automatic restoration state without waiting for the restoration delay when the attribute value reaches a restoration condition, to immediately start to restore the attribute value. Therefore, a player can rapidly restore the attribute value without being affected (for example, being attacked) in a short time, and join a subsequent battle as soon as possible. This can greatly enhance desire of the player to participate in the battle and speed up the completion of a single round.

In some embodiments, after step 203, the method may further include step 204: Determine, based on the target attribute value restoration delay within the preset period of time in which the attribute value restoration delay of the first virtual object is determined as the target attribute value restoration delay, that the first virtual object enters the attribute value automatic restoration state.

In one embodiment, if the first virtual object uses the virtual prop to defeat the second virtual object when waiting for the default attribute value restoration delay, the terminal determines the target attribute value restoration delay, determines whether a time length from an attribute value reduction time to a current moment reaches the target attribute value restoration delay, and if yes, controls the first virtual object to enter the attribute value automatic restoration state.

In some embodiments, the terminal controls the first virtual object to automatically restore the attribute value at a predetermined speed. The predetermined speed is fixed, or increases with time, or is determined by the terminal according to a remaining attribute value of the first virtual object, which is not limited in this embodiment of the present disclosure.

To sum up, in this embodiment of the present disclosure, when the skill restoration prop is equipped, the attribute value restoration delay is reduced by defeating the second virtual object with the virtual prop, so that the attribute value of the first virtual object can be restored in time. This avoids that after the user controls the first virtual object to defeat the second virtual object, the first virtual object is defeated by other virtual objects because the first virtual object cannot defend or restore the attribute value in time. This can help a user to control the first virtual object to participate in a battle, improve the utilization of the virtual prop, effectively control duration of a single round, and reduce processing pressure of a server.

In one embodiment, to increase a probability that the user controls a virtual object to use a short-distance virtual prop and a throwing virtual prop, and speed up the competition for a stronghold to effectively control the duration of a single round, the terminal determines the target attribute value restoration delay according to the virtual prop used by the first virtual object and the location relationship between the first virtual object and the target stronghold.

Figure 5:
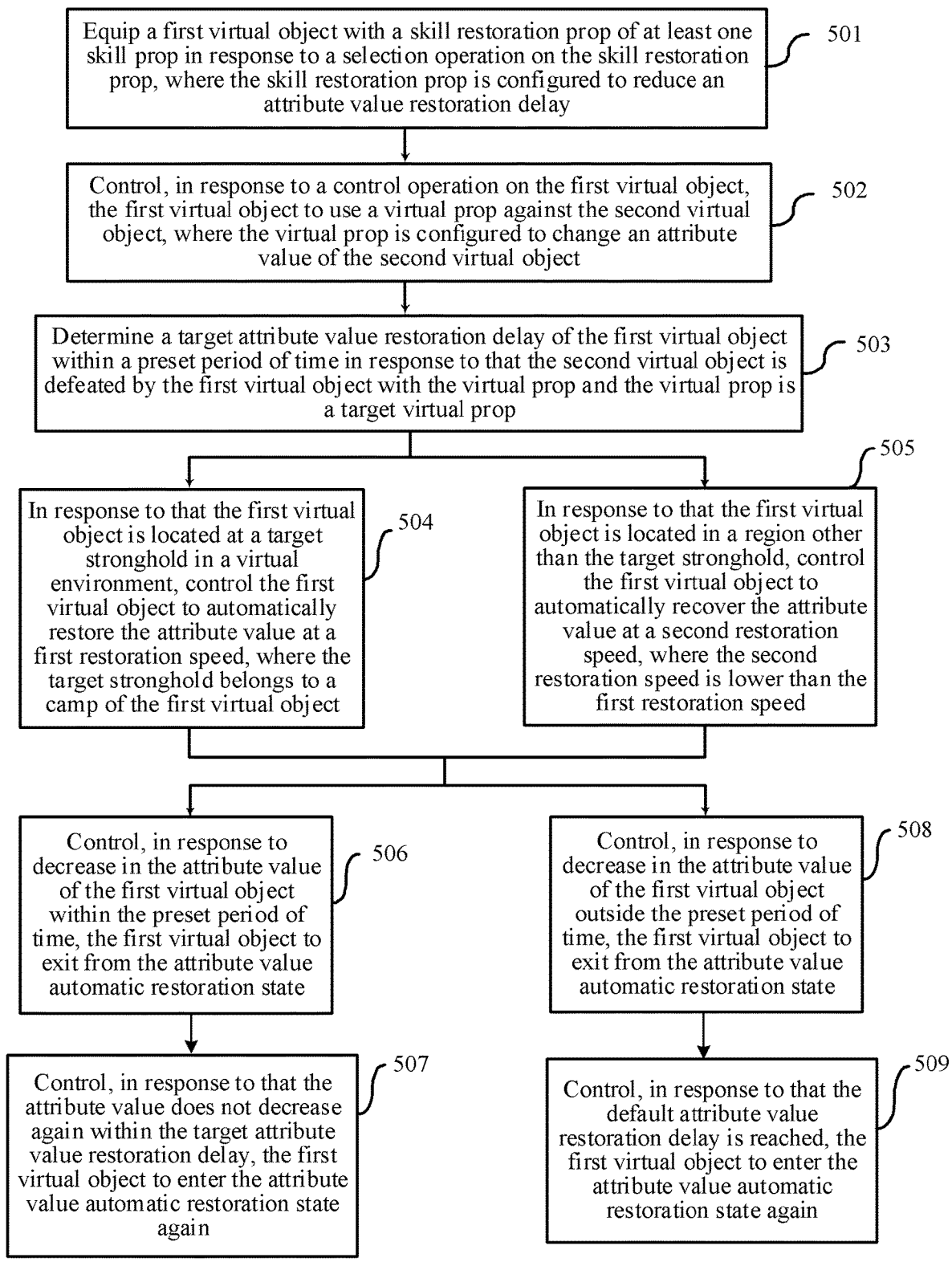
FIG. 5 is a flowchart of a method for controlling a virtual object to restore an attribute value according to another exemplary embodiment of the present disclosure.

FIG. 5 is a flowchart of a method for controlling a virtual object to restore an attribute value according to another exemplary embodiment of the present disclosure. In this embodiment, for example, the method is applied to the first terminal 110 or the second terminal 130 in the implementation environment shown in FIG. 1 or another terminal in the implementation environment. The method is applied to a virtual environment, the virtual environment includes a first virtual object and a second virtual object, and the first virtual object and the second virtual object belong to different camps. The method includes the following steps:

Step 501: Equip the first virtual object with a skill restoration prop of at least one skill prop in response to a selection operation on the skill restoration prop, where the skill restoration prop is configured to reduce an attribute value restoration delay.

Step 502: Control, in response to a control operation on the first virtual object, the first virtual object to use a virtual prop against the second virtual object, where the virtual prop is configured to change an attribute value of the second virtual object.

For the implementations of the steps 501 and 502, reference may be made to the steps 401 and 402, and details are not described again in the embodiments of the present disclosure.

Step 503: Determine a target attribute value restoration delay of the first virtual object within a preset period of time in response to that the second virtual object is defeated by the first virtual object with the virtual prop and the virtual prop belongs to a target virtual prop.

The target virtual prop includes at least one of a short-distance virtual prop or a throwing virtual prop. In some embodiments, the short-distance virtual prop and the throwing virtual prop are triggered by a collision box detection mechanism to change the attribute value of the second virtual object.

Since the first virtual object is far away from the second virtual object when using a remote virtual prop (for example, a gun) against the second virtual object, it is convenient for the user to control the first virtual object to perform operations such as moving, attacking, and defending. Besides, a probability of being attacked by the second virtual object and reducing the attribute value is low. Therefore, the attribute value restoration delay has little impact on the first virtual object by default. When the first virtual object uses a short-distance virtual prop (a knife as shown in FIG. 4) and a throwing virtual prop (for example, a flying ax or a flying knife) with a short throwing distance against the second virtual object, the first virtual object is close to the second virtual object and is easily attacked by the second virtual object. When there is another virtual object belonging to the same camp as the second virtual object, if the attribute value is restored according to the default attribute value restoration delay, an attribute value restoration process of the first virtual object is easily interrupted by another virtual object. Therefore, to avoid being defeated in a short-distance battle, the user usually plays the game through squatting or long-distance attack. To improve the utilization of a short-distance virtual prop and a throwing virtual prop, and help the user to control the first virtual object to participate in the battle to effectively control the progress of the game, in one embodiment, a target virtual prop is preset in the game. When the first virtual object uses the target virtual prop to defeat the second virtual object and the first virtual object is equipped with the skill restoration prop, the terminal determines the target attribute value restoration delay.

Figure 6:
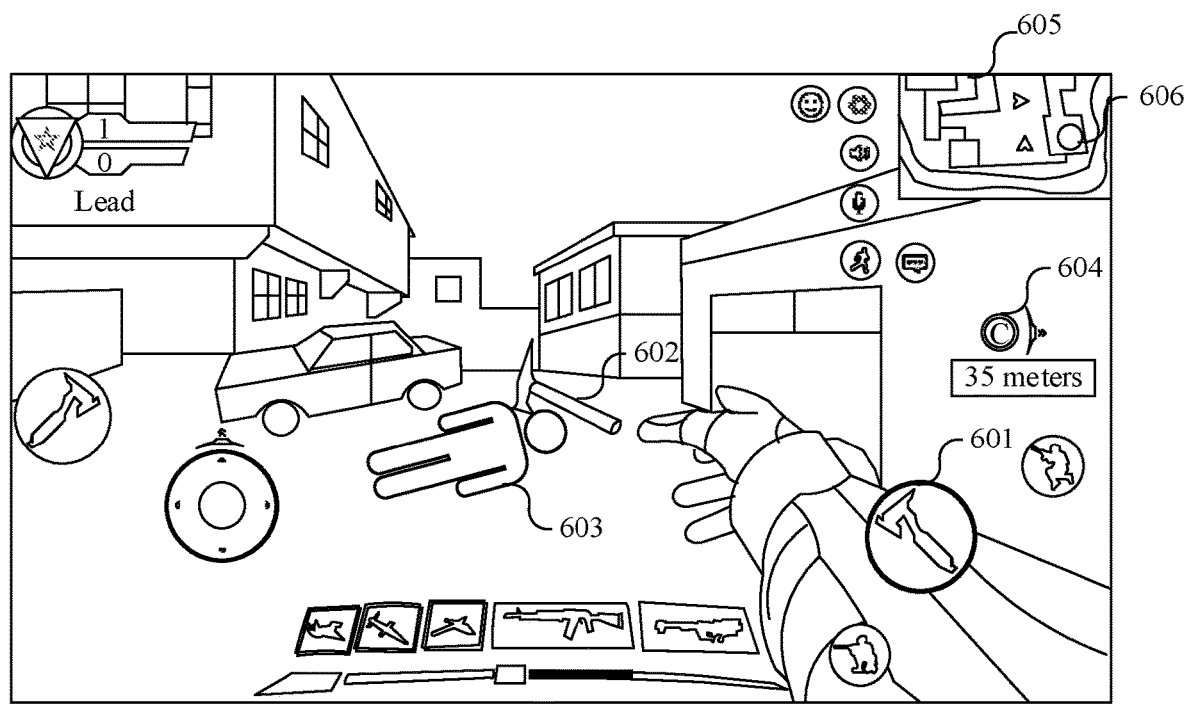
FIG. 6 is a schematic diagram of controlling a first virtual object to defeat a second virtual object according to an exemplary embodiment of the present disclosure.

Illustratively, FIG. 6 is a schematic diagram of using a throwing virtual prop against the second virtual object. The user controls the first virtual object to throw a target virtual prop 602 at the second virtual object 603 by triggering an attack control 601. If the second virtual object 603 is defeated, the terminal determines the target attribute value restoration delay of the first virtual object.

In some embodiments, the target virtual prop is triggered by a collision box detection mechanism to change the attribute value of the second virtual object. A model of the target virtual prop is correspondingly provided with a first collision detection box. Similarly, a model of the second virtual object is correspondingly provided with a second collision detection box. The collision detection box is used to detect whether another virtual object or virtual prop in the virtual environment is in contact with a virtual object or a virtual prop of the collision detection box. The terminal obtains a coordinate range of each collision detection box in the virtual environment in real time, and in response to that the first collision detection box collides with the second collision detection box (that is, a coordinate range of the first collision detection box and a coordinate range of the second collision detection box have an intersection point), determines that the target virtual prop acts on the second virtual object and correspondingly changes the attribute value of the second virtual object. In some embodiments, the collision detection boxes are not displayed in the virtual environment image.

Figure 7:
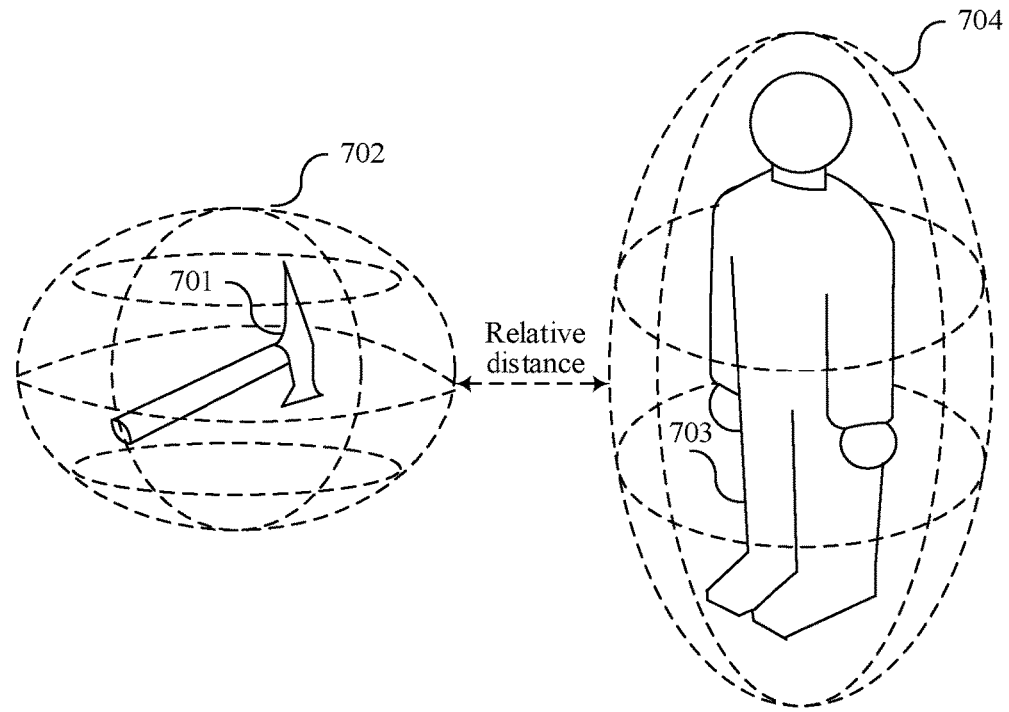
FIG. 7 is a schematic diagram of a first collision detection box and a second collision detection box according to an exemplary embodiment of the present disclosure.

Illustratively, FIG. 7 is a schematic diagram of a first collision detection box and a second collision detection box. A first collision detection box 702 is arranged around the model of the target virtual prop 701 (a dashed area in the figure is a range of the first collision detection box), and a shape of the model of the first collision detection box 702 is an ellipsoid. The center point of the first collision detection box 702 is the same as the center point of the model of the target virtual prop 701. A second collision detection box 704 is arranged around the model of the second virtual object 703, and a shape of the model of the second collision detection box 704 is an ellipsoid. The center point of the second collision detection box 704 is the same as the center point of the model of the second virtual object 703. In some embodiments, a shape of a collision detection box may be the same as a shape of a virtual object or a virtual prop of the collision detection box, or may be other preset shapes, which is not limited in this embodiment of the present disclosure. When the first collision detection box 702 is in contact with the second collision detection box 704, the terminal determines that the target virtual prop 701 acts on the second virtual object 703.

As a distance between the first virtual object and the second virtual object is closer, a possibility of attacking the first virtual object by the second virtual object is higher, and a possibility that an attribute value restoration process is interrupted is higher. Therefore, in one embodiment, step 503 includes the following steps:

determining the target attribute value restoration delay according to an attack distance of the target virtual prop, where the target attribute value restoration delay is positively correlated with the attack distances.

In one embodiment, a correspondence between the attack distance of the target virtual prop and the target attribute value restoration delay is preset in a game application program of this embodiment of the present disclosure, and the target attribute value restoration delay is shorter than or equal to the default attribute value restoration delay. The attack distance of the target virtual prop is a distance between the first virtual object and the second virtual object in the virtual environment when the first virtual object uses the target virtual prop.

Illustratively, when the attack distance is less than 5 m, the corresponding target attribute value restoration delay is 0 s. To be specific, when the distance between the first virtual object and the second virtual object is less than 5 m, if the target virtual prop is configured to defeat the second virtual object, the terminal controls the first virtual object to restore the attribute value immediately. When the attack distance is greater than or equal to 5 m and less than 10 m, the target attribute value restoration delay is 2 s. When the attack distance is greater than or equal to 10 m, the target attribute value restoration delay is 5 s.

In another embodiment, to help the user to control the first virtual object to participate in the battle, the throwing virtual prop includes a virtual prop for assisting the battle, for example, a smoke bomb or a flash bomb that may help other virtual objects to defeat the second virtual object. For example, when a third virtual object uses the target virtual prop against the second virtual object, if the terminal receives a control operation for controlling the first virtual object to use an auxiliary virtual prop against the second virtual object and the first virtual object is equipped with a skill restoration prop, the terminal determines the target attribute value restoration delay of the first virtual object when the second virtual object is defeated by the third virtual object with the target virtual prop. The third virtual object and the first virtual object belong to the same camp. In this process, the terminal needs to monitor the cooperative operation of the first virtual object and the third virtual object, and determine that the target virtual prop used by the third virtual object and the target virtual prop used by the first virtual object act on the same second virtual object.

Step 504: In response to that the first virtual object is located in a target stronghold in the virtual environment, control the first virtual object to automatically restore the attribute value at a first restoration speed, where the target stronghold belongs to a camp of the first virtual object.

An execution sequence or an inevitable relationship between step 504, step 505, and step 503 is not limited in this embodiment, that is, FIG. 5 is only an example. In one embodiment, step 504 and step 505 may be performed after step 501.

In one embodiment, when a game starts, there are a predetermined number of strongholds in the virtual environment, the strongholds are pre-selected regions with particular areas in a game application program, and a virtual object participating in the game obtains a score of a camp by capturing a stronghold.

Figure 8:
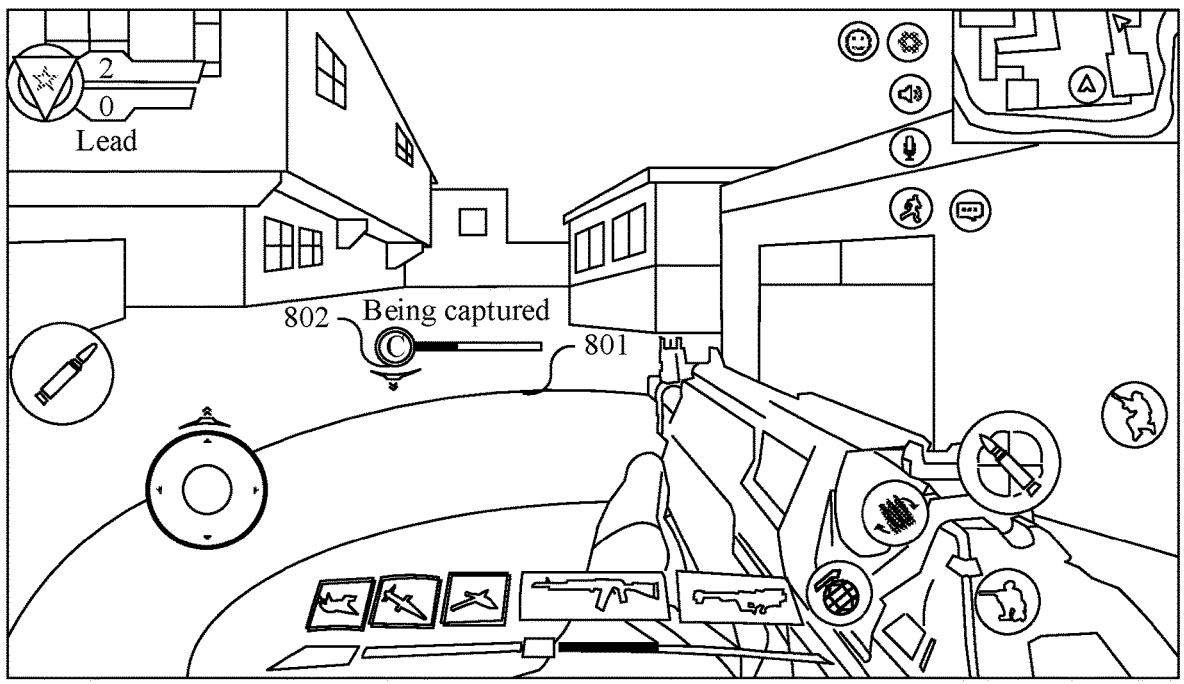
FIG. 8 is a schematic diagram of controlling a first virtual object to occupy a stronghold according to an exemplary embodiment of the present disclosure.

Illustratively, FIG. 8 is a schematic diagram of a process of capturing a stronghold. When the first virtual object reaches a stronghold 801, the terminal sets a timer for the first virtual object, and displays a capturing progress bar through a stronghold identifier 802. When a period of time in which the first virtual object continues to be located in the stronghold 801 reaches a period of time of the timer, capturing succeeds, and the terminal determines that the stronghold 801 belongs to the camp of the first virtual object.

Figure 9:
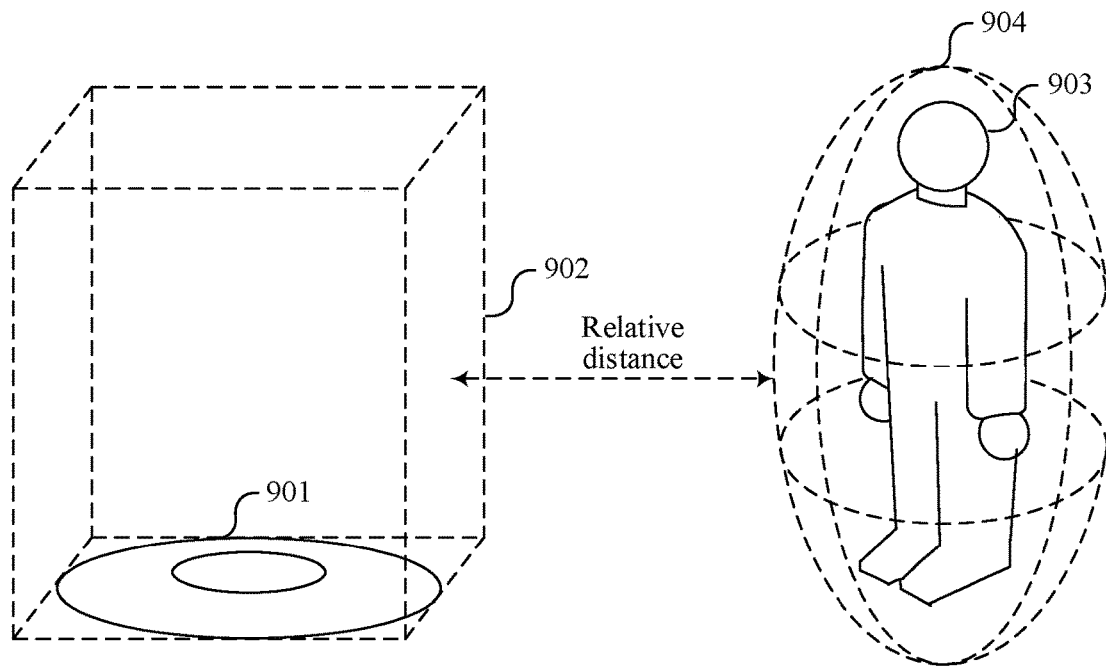
FIG. 9 is a schematic diagram of a third collision detection box and a fourth collision detection box according to an exemplary embodiment of the present disclosure.

In some embodiments, the terminal determines, based on the collision box detection mechanism, whether the first virtual object is located in the target stronghold. As shown in FIG. 9, a model of a target stronghold 901 is correspondingly provided with a third collision detection box 902, and similarly, a model of the first virtual object 903 is correspondingly provided with a fourth collision detection box 904. The terminal obtains a coordinate range of each collision detection box in the virtual environment in real time, and in response to that the third collision detection box 902 collides with the fourth collision detection box 904 (that is, a coordinate range of the third collision detection box 902 and a coordinate range of the fourth collision detection box 904 have an intersection point), it is determined that the first virtual object 903 is located in the target stronghold 901. In some embodiments, the collision detection boxes are not displayed in the virtual environment image.

In one embodiment, the skill restoration prop is also used to increase an attribute value restoration speed. If the first virtual object uses the target virtual prop to defeat the second virtual object in the target stronghold in the virtual environment, the terminal controls the first virtual object to automatically restore the attribute value at the first restoration speed according to the skill restoration prop. The first restoration speed is faster than a preset restoration speed.

In some embodiments, the first restoration speed gradually increases with the increase of time, so that the first virtual object restores the attribute value slowly for a period of time after the first virtual object starts to automatically restore the attribute value. This prevents the first virtual object from instantly restoring an excessively high attribute value after defeating the second virtual object, making it difficult for another virtual object to defeat the first virtual object.

In another embodiment, if the first virtual object does not use the target virtual prop to defeat the second virtual object, but the first virtual object is located in the target stronghold and is equipped with the skill restoration prop, the terminal controls, according to the default attribute value restoration delay and the first restoration speed, the first virtual object to automatically restore the attribute value.

Step 505: In response to that the first virtual object is located in a region other than the target stronghold, control the first virtual object to automatically restore the attribute value at a second restoration speed, where the second restoration speed is lower than the first restoration speed.

In one embodiment, a virtual object in a game obtains a score of a camp by capturing a stronghold in the virtual environment, thereby winning the game. To help the user to control the virtual object to participate in the competition for the stronghold to control the duration of a single-round battle, the second restoration speed of the first virtual object located outside the target stronghold is lower than the first restoration speed of the first virtual object located in the target stronghold.

In another embodiment, if the first virtual object uses a virtual prop against the second virtual object during the competition for the stronghold, the skill restoration prop may also be triggered. As shown in an upper schematic diagram in FIG. 10, if the first virtual object is equipped with the skill restoration prop and is located outside the target stronghold, when the terminal learns that the first virtual object is controlled to use a virtual prop 1003 against the second virtual object 1002 located in a stronghold 1001, the terminal controls the first virtual object to automatically restore the attribute value according to the default attribute value restoration delay and the first restoration speed. The stronghold 1001 includes the target stronghold and other strongholds that may be captured.

In one embodiment, the method for controlling a virtual object to restore an attribute value according to this embodiment of the present disclosure further includes the following steps:

in response to that the attribute value of the first virtual object is less than the threshold and a relative location of the target stronghold relative to the first virtual object is located within the line of sight of the first virtual object, displaying a location identifier of the target stronghold at a location corresponding to the relative location in an image of the virtual environment.

In one embodiment, the target stronghold may not currently fall within the visible range of the first virtual object (that is, the virtual environment image displayed by the terminal). To help the user to control the first virtual object to rapidly move to the target stronghold, the terminal displays the location identifier of the target stronghold at the location corresponding to the relative location in the image of the virtual environment. The location identifier is not blocked by a virtual object such as a building.

In some embodiments, the location identifier of the target is displayed in the virtual environment image. Besides, an arrow pointing from the location of the first virtual object to the target stronghold, a distance between the location of the first virtual object and the target stronghold, and a text prompt "go to the target stronghold" are also displayed in real time. This is not limited in this embodiment of the present disclosure.

In some embodiments, the terminal displays the location identifier of the target stronghold in a map display control, and sets a color or highlight mark different from that of another stronghold for the location identifier of the target stronghold, to remind the user to control the first virtual character to go to the location.

Illustratively, as shown in FIG. 6, the target stronghold does not fall within the visible range of the first virtual object (that is, the virtual environment image displayed by the terminal), and the terminal displays a location identifier 604 of the target stronghold at the location corresponding to the relative location in the image of the virtual environment. The location identifier further includes a distance between the first virtual object and the target stronghold. In addition, the terminal also displays a location identifier 606 of the target stronghold through a map display control 605.

Step 506: Control, in response to decrease in the attribute value of the first virtual object within the preset period of time, the first virtual object to exit from the attribute value automatic restoration state.

In one embodiment, the attribute value restoration delay is a time interval between the latest attribute value reduction time and an attribute value automatic restoration time. Therefore, when the attribute value of the first virtual object decreases within the preset period of time, if the first virtual object is in the attribute value automatic restoration state, the terminal controls the first virtual object to exit from the attribute value automatic restoration state.

Step 507: Control, in response to that the attribute value does not decrease again within the target attribute value restoration delay, the first virtual object to enter the attribute value automatic restoration state again.

In a short-distance battle, when there is a virtual object belonging to the same camp as the second virtual object, the attribute value of the first virtual object may decrease after the first virtual object defeats the second virtual object. To ensure that the first virtual object can restore the attribute value in time during the battle, the attribute value restoration delay of the first virtual object within the preset period of time is always the target attribute value restoration delay.

In one embodiment, if the preset period of time is not reached and the attribute value of the first virtual object does not decrease again within the target attribute value restoration delay, the first virtual object may still enter the attribute value automatic restoration state.

Step 508: Control, in response to decrease in the attribute value of the first virtual object after the preset period of time, the first virtual object to exit from the attribute value automatic restoration state.

Similarly, in one embodiment, the attribute value restoration delay is a time interval between the latest attribute value reduction time and an attribute value automatic restoration time. Therefore, when the attribute value of the first virtual object decreases after the preset period of time, if the first virtual object is in the attribute value automatic restoration state, the terminal controls the first virtual object to exit from the attribute value automatic restoration state and timing is restarted.

Step 509: Control, in response to that the default attribute value restoration delay is reached, the first virtual object to enter the attribute value automatic restoration state again.

In one embodiment, since the first virtual object can restore the attribute value according to the target attribute value restoration delay only within the preset period of time after defeating the second virtual object, the first virtual object can enter the attribute value automatic restoration state again after the preset period of time only after the default attribute value restoration delay is reached.

In some embodiments, if the attribute value restoration delay of the first virtual object is immediately restored to the default attribute value restoration delay after the preset period of time is reached, the attribute value cannot be restored in time when the first virtual object is still in a battle state. Therefore, the terminal increases the attribute value restoration delay on the basis of the target attribute value restoration delay according to a time interval between a preset duration arrival moment and a current moment.

Illustratively, the target attribute value restoration delay is 2 s, and the preset period of time is 2 s. When the preset period of time is reached, the terminal increases the attribute value restoration delay by is every 2 s on the basis of the target attribute value restoration delay. That is, within 0 s to 2 s after the second virtual object is defeated by the first virtual object, the attribute value restoration delay of the first virtual object is 2 s, within 2 s to 4 s after the second virtual object is defeated by the first virtual object, the attribute value restoration delay of the first virtual object is 3 s, and within 4 s to 6 s after the second virtual object is defeated by the first virtual object, the attribute value restoration delay of the first virtual object is 4 s, until the attribute value restoration delay reaches the default attribute value restoration delay.

In this embodiment of the present disclosure, the terminal may determine the target attribute value restoration delay only when the first virtual object uses the target virtual prop to defeat the second virtual object, to help the user to control the first virtual object to attack the second virtual object, and improve the utilization of a short-distance virtual prop and a throwing virtual prop. In addition, determining a speed of automatically restoring the attribute value according to the location relationship between the first virtual object and the target stronghold may help the user to control the first virtual object to capture the stronghold, thereby effectively controlling the duration of a single round.

Figure 11:
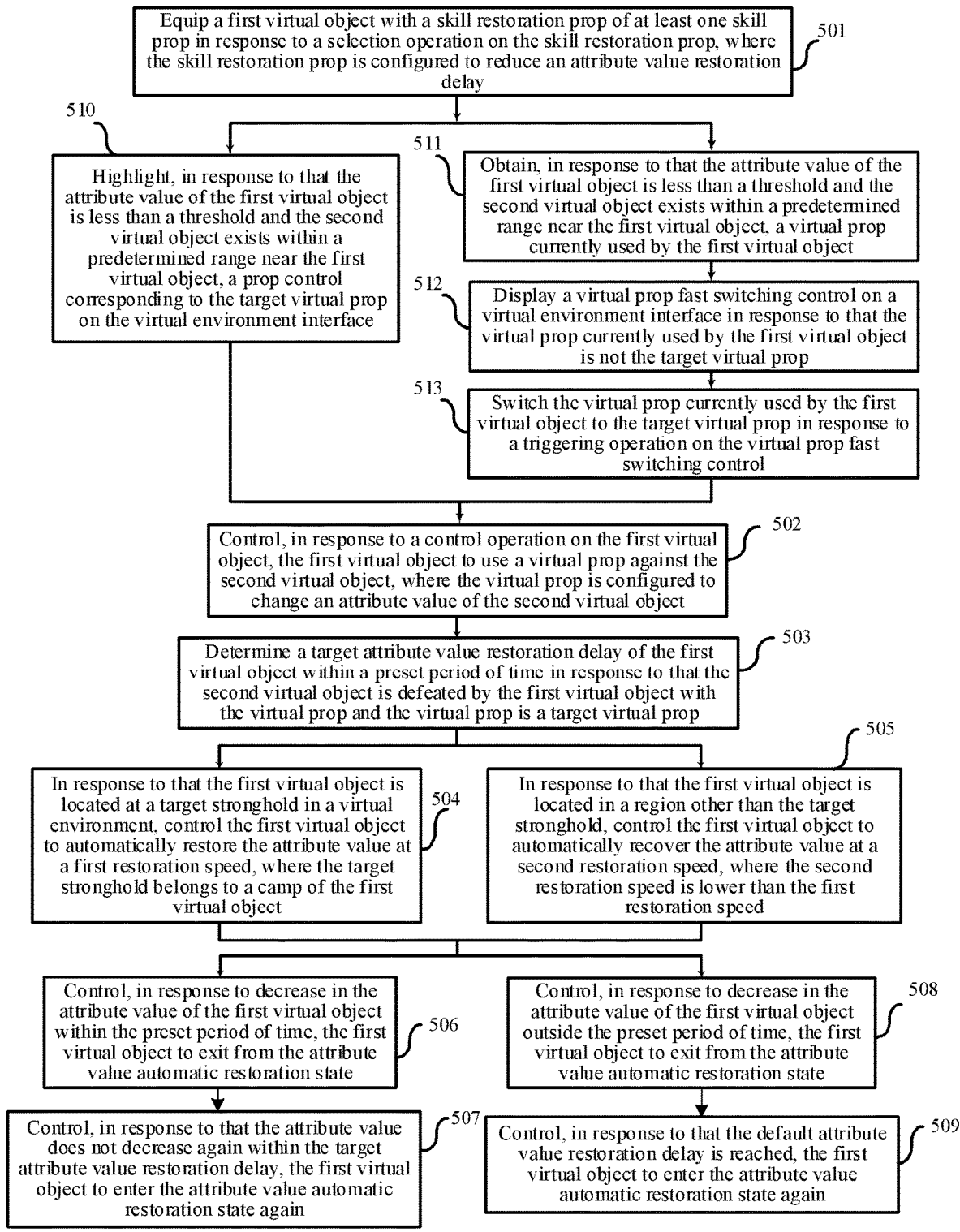
FIG. 11 is a flowchart of a method for controlling a virtual object to restore an attribute value according to another exemplary embodiment of the present disclosure.

To help the user to control the first virtual object to use the target virtual prop to defeat the second virtual object, to reduce the attribute value restoration delay, in one embodiment, on the basis of FIG. 5, refer to FIG. 11. Before step 502, the method for controlling a virtual object to restore an attribute value further includes steps 510 to 513:

Step 510: Highlight, in response to that the attribute value of the first virtual object is less than a threshold and the second virtual object exists within a predetermined range near the first virtual object, a prop control corresponding to the target virtual prop on the interface of the virtual environment.

In one embodiment, the virtual environment interface includes a virtual prop display column for displaying virtual props owned by the first virtual object. When the attribute value of the first virtual object is less than the threshold and the second virtual object exists within the predetermined range near the first virtual object, the user may need to control the first virtual object to use the target virtual prop. Therefore, the terminal highlights a prop control corresponding to the target virtual prop on the virtual environment interface.

In some embodiments, the terminal highlights prop controls corresponding to all target virtual props. Alternatively, the terminal automatically selects a target virtual prop and highlights a prop control of the target virtual prop.

Step 511: Obtain, in response to that the attribute value of the first virtual object is less than a threshold and the second virtual object exists within a predetermined range near the first virtual object, a virtual prop currently used by the first virtual object.

In one embodiment, when the attribute value of the first virtual object is less than the threshold, the first virtual object may be easily defeated, and the terminal obtains, in real time, a virtual object existing within the predetermined range near the first virtual object. When the second virtual object exists, the terminal obtains the virtual prop currently used by the first virtual object, so that the terminal reminds, when the virtual prop currently used by the first virtual object is not the target virtual prop, the user to switch the virtual prop.

Step 512: Display a virtual prop switching control on an interface of the virtual environment in response to that the virtual prop currently used by the first virtual object is not the target virtual prop.

In one embodiment, when the attribute value of the first virtual object is less than the threshold and the second virtual object exists within the predetermined range near the first virtual object, the user may need the target virtual prop at a high probability. When the first virtual object is equipped with a large number of virtual props, the virtual props are accommodated in prop bars, and the user may need to switch a prop bar to find a control of the target virtual prop. Therefore, to help the user to rapidly switch the virtual prop, the terminal displays the virtual prop switching control on the virtual environment interface when the virtual prop currently used by the first virtual object is not the target virtual prop.

In some embodiments, the virtual prop switching control is a control that triggers display of the target virtual prop owned by the first virtual object, or the virtual prop switching control is a default selection control of the target virtual prop.

In some embodiments, the terminal specially marks or highlights the virtual prop switching control.

Figure 10:
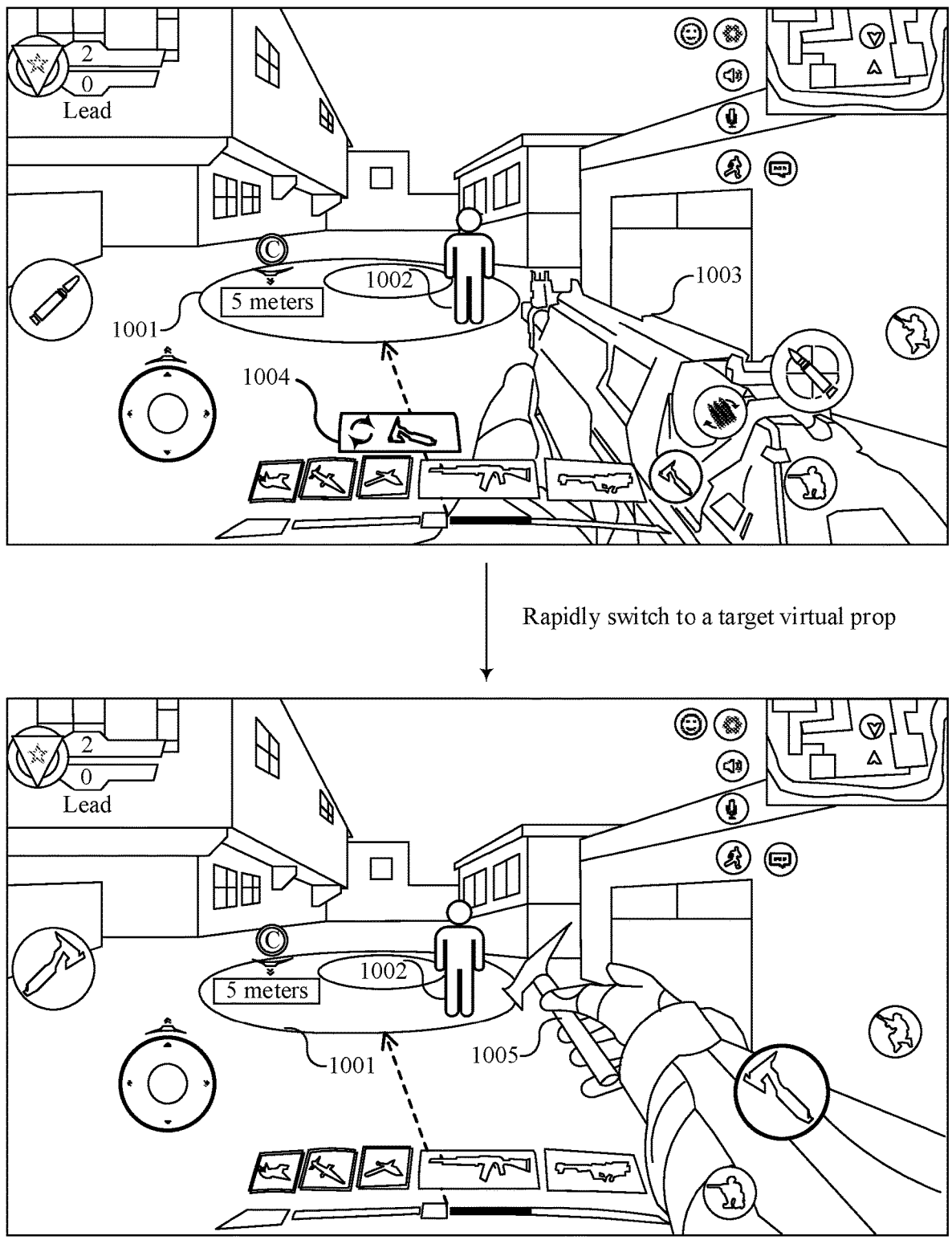
FIG. 10 is a schematic diagram of rapidly switching a virtual prop according to an exemplary embodiment of the present disclosure.

Illustratively, as shown in FIG. 10, a second virtual object 1002 exists within the predetermined range near the first virtual object and the attribute value of the first virtual object is less than the threshold, and the terminal displays a virtual prop switching control 1004 on the virtual environment interface. The virtual prop switching control 1004 is used to control the first virtual object to be equipped with a flying ax.

Step 513: Switch the virtual prop currently used by the first virtual object to the target virtual prop in response to a triggering operation on the virtual prop switching control.

In one embodiment, as shown in FIG. 10, the virtual prop switching control 1004 is a default selection control of the target virtual prop. When receiving a trigger operation on the virtual prop switching control 1004, the terminal switches a virtual prop 1003 currently used by the first virtual object to the target virtual prop 1005 (for example, the flying ax).

In this embodiment of the present disclosure, when the attribute value of the first virtual object is less than the threshold and the second virtual object exists within the predetermined range near the first virtual object, the terminal displays the virtual prop switching control, or highlights the prop control corresponding to the target virtual prop, to help the user to switch, in time, the virtual prop used by the first virtual object and defeat the second virtual object with the virtual prop so that the attribute value can be restored in time.

Figure 12:
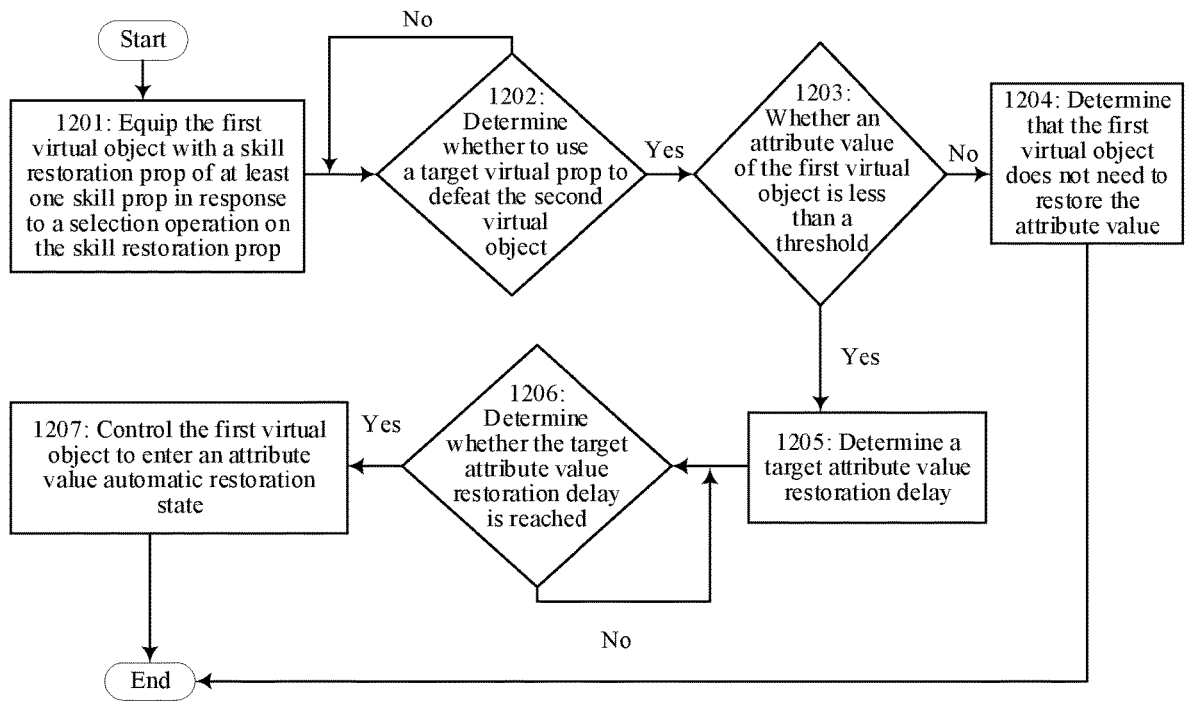
FIG. 12 is a flowchart of a method for controlling a virtual object to restore an attribute value according to another exemplary embodiment of the present disclosure.

In combination with the above embodiments, in an illustrative example, a process of controlling a virtual object to restore an attribute value is shown in FIG. 12.

Step 1201: Equip the first virtual object with a skill restoration prop of at least one skill prop in response to a selection operation on the skill restoration prop.

Step 1202: Determine whether to use a target virtual prop to defeat the second virtual object. If yes, perform step 1203.

Step 1203: Whether an attribute value of the first virtual object is less than a threshold. If not, perform step 1204, or if yes, perform step 1205.

Step 1204: Determine that the first virtual object does not need to restore the attribute value.

Step 1205: Determine a target attribute value restoration delay.

Step 1206: Determine whether the target attribute value restoration delay is reached. If yes, perform step 1207.

Step 1207: Control the first virtual object to enter an attribute value automatic restoration state.

Figure 13:
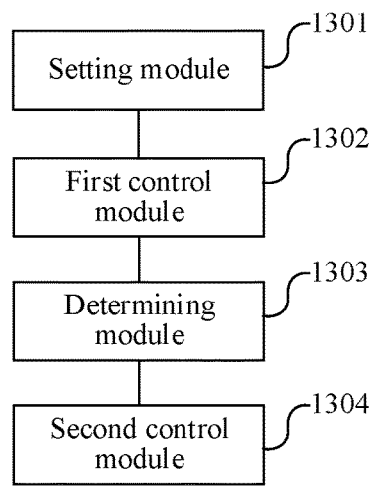
FIG. 13 is a structural block diagram of an apparatus for controlling a virtual object to restore an attribute value according to an exemplary embodiment of the present disclosure.

FIG. 13 is a structural block diagram of an apparatus for controlling a virtual object to restore an attribute value according to an exemplary embodiment of the present disclosure. The apparatus may be arranged in the first terminal 120 or the second terminal 160 in the implementation environment shown in FIG. 1 or another terminal in the implementation environment. The apparatus is applied to a virtual environment, the virtual environment includes a first virtual object and a second virtual object, and the first virtual object and the second virtual object belong to different camps. The apparatus includes:

a setting module 1301, configured to equip the first virtual object with a skill restoration prop in response to a selection operation on the skill restoration prop, where the skill restoration prop is configured to reduce an attribute value restoration delay, and when an attribute value of a virtual object decreases and does not decrease again within the attribute value restoration delay, the virtual object enters an attribute value automatic restoration state;

a first control module 1302, configured to control, in response to a control operation on the first virtual object, the first virtual object to use a virtual prop against the second virtual object, where the virtual prop is configured to change an attribute value of the second virtual object; and a determining module 1303, configured to determine an attribute value restoration delay of the first virtual object as a target attribute value restoration delay within a preset period of time according to the skill restoration prop in response to that the second virtual object is defeated by the first virtual object with the virtual prop, where the target attribute value restoration delay is shorter than a default attribute value restoration delay.

In some embodiments, the determining module 1303 includes:

a determining unit, configured to determine the attribute value restoration delay of the first virtual object within the preset period of time as the target attribute value restoration delay according to the skill restoration prop in response to that the second virtual object is defeated by the first virtual object with the virtual prop and the virtual prop is a target virtual prop;

The target virtual prop includes at least one of a short-distance virtual prop and a throwing virtual prop. The short-distance virtual prop and the throwing virtual prop are triggered by a collision box detection mechanism to change the attribute value of the second virtual object.

In some embodiments, the determining unit is further configured to:

determining the target attribute value restoration delay according to the skill restoration prop and an attack distance of the target virtual prop, where the target attribute value restoration delay is positively correlated with the attack distances.

In some embodiments, the apparatus further includes:

an obtaining module, configured to obtain, in response to that the attribute value of the first virtual object is less than a threshold and the second virtual object exists within a predetermined range near the first virtual object, a virtual prop currently used by the first virtual object;

a first display module, configured to display a virtual prop switching control on an interface of the virtual environment in response to that the virtual prop currently used by the first virtual object is not the target virtual prop; and a second display module, configured to switch the virtual prop currently used by the first virtual object to the target virtual prop in response to a triggering operation on the virtual prop switching control.

In some embodiments, the apparatus further includes:

a third display module, configured to highlight, in response to that the attribute value of the first virtual object is less than a threshold and the second virtual object exists within a predetermined range near the first virtual object, a prop control corresponding to the target virtual prop on the interface of the virtual environment.

In some embodiments, the apparatus further includes a second control module, configured to: determine, based on the target attribute value restoration delay within the preset period of time in which the attribute value restoration delay of the first virtual object is determined as the target attribute value restoration delay, that the first virtual object enters the attribute value automatic restoration state.

The time length identified by the target attribute value restoration delay is 0.

In some embodiments, the skill restoration prop is also used to increase an attribute value restoration speed.

The second control module includes:
- a first control unit, configured to: in response to that the first virtual object is located in a target stronghold in the virtual environment, control, according to the skill restoration prop, the first virtual object to automatically restore the attribute value at a first restoration speed, where the target stronghold belongs to a camp of the first virtual object; and
- a second control unit, configured to: in response to that the first virtual object is located in a region other than the target stronghold, control the first virtual object to automatically restore the attribute value at a second restoration speed, where the second restoration speed is lower than the first restoration speed.

In some embodiments, the apparatus further includes:
- a fourth display module, configured to display a location identifier of the target stronghold in an image of the virtual environment in response to that the attribute value of the first virtual object is less than the threshold and the target stronghold is located within the line of sight of the first virtual object.

In some embodiments, the apparatus further includes:
- a third control module, configured to control, in response to decrease in the attribute value of the first virtual object within the preset period of time, the first virtual object to exit from the attribute value automatic restoration state; and control, in response to that the attribute value does not decrease again within the target attribute value restoration delay, the first virtual object to enter the attribute value automatic restoration state again; and
- a fourth control module, configured to control, in response to decrease in the attribute value of the first virtual object after the preset period of time, the first virtual object to exit from the attribute value automatic restoration state; and control, in response to that the default attribute value restoration delay is reached, the first virtual object to enter the attribute value automatic restoration state again.

To sum up, in this embodiment of the present disclosure, when the skill restoration prop is equipped, the attribute value restoration delay is reduced by defeating the second virtual object with the virtual prop, so that the attribute value of the first virtual object can be restored in time. This avoids that after the user controls the first virtual object to defeat the second virtual object, the first virtual object is defeated by other virtual objects because the first virtual object cannot defend or restore the attribute value in time. This can help a user to control the first virtual object to participate in a battle, improve the utilization of the virtual prop, effectively control duration of a single round, and reduce processing pressure of a server.

In this embodiment of the present disclosure, the terminal may determine the target attribute value restoration delay only when the first virtual object uses the target virtual prop to defeat the second virtual object, to help the user to control the first virtual object to attack the second virtual object, and improve the utilization of a short-distance virtual prop and a throwing virtual prop. In addition, determining a speed of automatically restoring the attribute value according to the location relationship between the first virtual object and the target stronghold may help the user to control the first virtual object to capture the stronghold, thereby effectively controlling the duration of a single round.

In this embodiment of the present disclosure, when the attribute value of the first virtual object is less than the threshold and the second virtual object exists within the predetermined range near the first virtual object, the terminal displays the virtual prop switching control, or highlights the prop control corresponding to the target virtual prop, to help the user to switch, in time, the virtual prop used by the first virtual object and defeat the second virtual object with the virtual prop so that the attribute value can be restored in time.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 14:
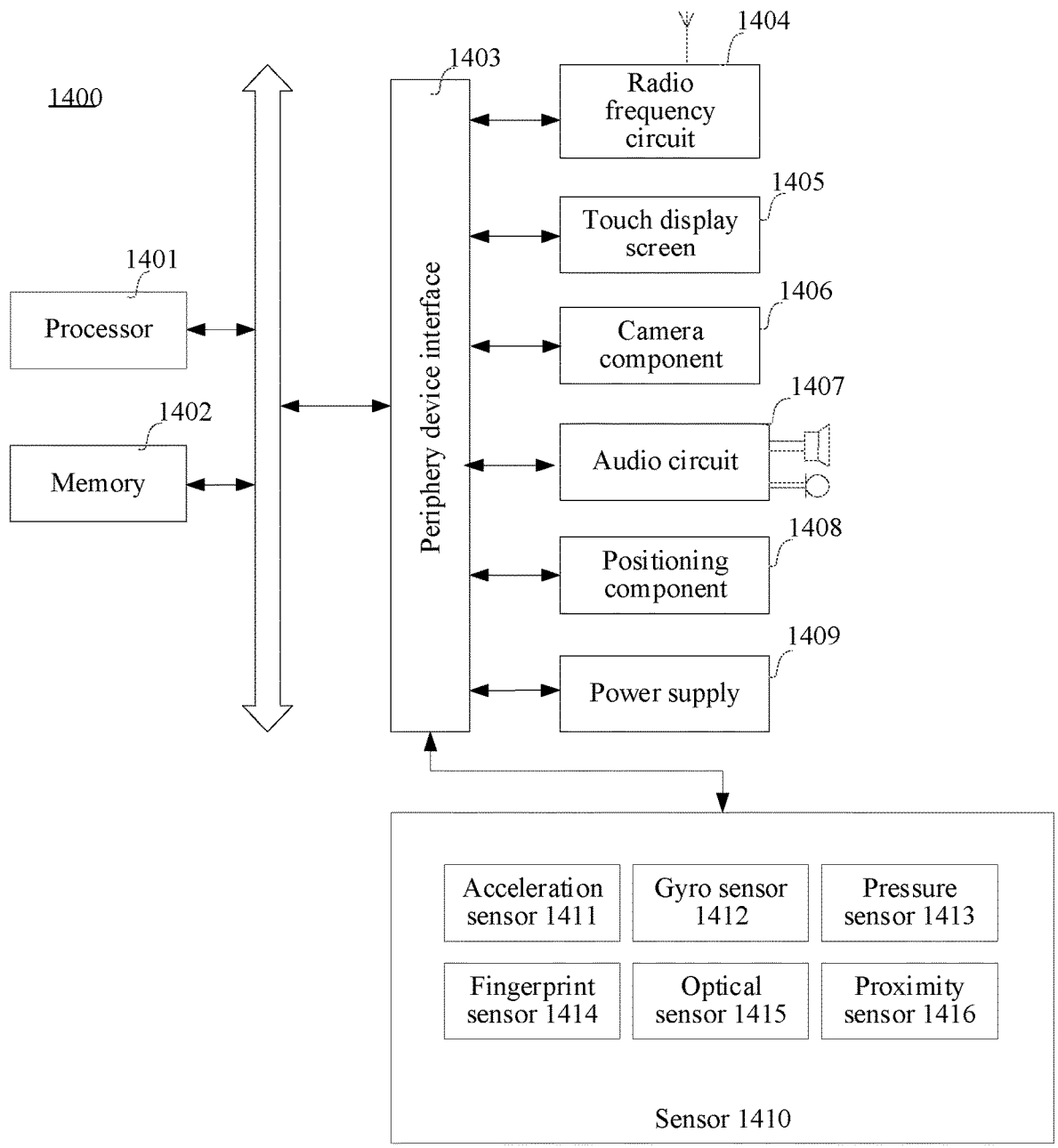
FIG. 14 is a structural block diagram of a terminal according to an exemplary embodiment of the present disclosure.

FIG. 14 is a structural block diagram of a terminal 1400 according to an exemplary embodiment of the present disclosure. The terminal 1400 may be a portable mobile terminal such as a smart phone, a tablet PC, a Moving Picture Experts Group Audio Layer III (MP3), or a Moving Picture Experts Group Audio Layer IV (MP4) player. The terminal 1400 may be further referred to as other names such as user equipment and a portable terminal.

Generally, a terminal 1400 includes a processor 1401 and a memory 1402.

In some embodiments, the terminal 1400 may in some embodiments include a peripheral device interface 1403 and at least one peripheral device. Specifically, the peripheral device includes: at least one of a radio frequency (RF) circuit 1404, a display screen 1405, a camera component 1406, an audio circuit 1407, a positioning component 1408, and a power supply 1409.

In some embodiments, the terminal 1400 may also include one or more sensors 1410. The one or more sensors 1410 include, but are not limited to, an acceleration sensor 1411, a gyroscope sensor 1412, a pressure sensor 1413, a fingerprint sensor 1414, an optical sensor 1415, and a proximity sensor 1416.

A person skilled in the art may understand that the structure shown in FIG. 14 does not constitute a limitation to the terminal 1400, and the terminal may include more or fewer components than those shown in the figure, or some components may be combined, or a different component arrangement may be used.

An embodiment of the present disclosure further provides a computer-readable storage medium. The computer-readable storage medium is configured to store a computer program, and the computer program is configured to execute the method for controlling a virtual object to restore an attribute value according to the above embodiments.

According to an aspect of the present disclosure, a computer program product or a computer program is provided, the computer program product or the computer program including computer instructions, the computer instructions being stored in a computer-readable storage medium. A processor of a terminal reads the computer instruction from the computer-readable storage medium, and executes the computer instruction to cause the terminal to execute the method for controlling a virtual object to restore an attribute value according to various example embodiments of the above aspect.

A person skilled in the art should be aware that in the foregoing one or more examples, functions described in the embodiments of the present disclosure may be implemented by hardware, software, firmware, or any combination thereof. When implemented by using software, the functions can be stored in a computer-readable storage medium or can be used as one or more instructions or code in a computer-readable storage medium for transmission. The computer-readable storage medium includes a computer storage medium and a communications medium, where the communications medium includes any medium that enables a computer program to be transmitted from one place to another. The storage medium may be any available medium accessible to a general-purpose or dedicated computer.

The foregoing descriptions are merely example embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for controlling a virtual object to restore an attribute value, the method being performed by a computing terminal and applied to a virtual environment of a game, the virtual environment comprising a first virtual object and a second virtual object, the first virtual object and the second virtual object belonging to different camps in the game, and the method comprising:
    equipping the first virtual object with a skill restoration prop in the game in response to a selection operation on the skill restoration prop, the skill restoration prop being configured to reduce an attribute value restoration delay, wherein the attribute value restoration delay indicates that when an attribute value of a virtual object decreases and does not decrease again within the attribute value restoration delay, the virtual object enters a restoration state in which the attribute value is automatically restored;
    controlling, in response to a control operation on the first virtual object, the first virtual object to use a virtual prop against the second virtual object, the virtual prop being configured to change an attribute value of the second virtual object; and
    determining the attribute value restoration delay of the first virtual object as a target attribute value restoration delay within a preset period of time according to the skill restoration prop in response to that the second virtual object is defeated by the first virtual object with the virtual prop, the target attribute value restoration delay being shorter than a default attribute value restoration delay.

2. The method according to claim 1, wherein the determining an attribute value restoration delay of the first virtual object as a target attribute value restoration delay within a preset period of time according to the skill restoration prop in response to that the second virtual object is defeated by the first virtual object with the virtual prop comprises:
    determining the attribute value restoration delay of the first virtual object within the preset period of time as the target attribute value restoration delay according to the skill restoration prop in response to that the second virtual object is defeated by the first virtual object with the virtual prop and the virtual prop belongs to a target virtual prop;
    wherein the target virtual prop comprises at least one of a short-range virtual prop or a throwing virtual prop.

3. The method according to claim 2, wherein the determining the attribute value restoration delay of the first virtual object within the preset period of time as the target attribute value restoration delay according to the skill restoration prop comprises:
    determining the target attribute value restoration delay according to the skill restoration prop and an attack distance of the target virtual prop, wherein the target attribute value restoration delay is positively correlated with the attack distance.

4. The method according to claim 2, wherein before the controlling, in response to a control operation on the first virtual object, the first virtual object to use a virtual prop against the second virtual object, the method further comprises:
    obtaining, in response to that the attribute value of the first virtual object is less than a threshold and the second virtual object exists within a predetermined range near the first virtual object, a virtual prop currently used by the first virtual object;
    displaying a virtual prop switching control on an interface of the virtual environment in response to that the virtual prop currently used by the first virtual object is not the target virtual prop; and
    switching the virtual prop currently used by the first virtual object to the target virtual prop in response to a triggering operation on the virtual prop switching control.

5. The method according to claim 2, wherein before the controlling, in response to a control operation on the first virtual object, the first virtual object to use a virtual prop against the second virtual object, the method further comprises:
    highlighting, in response to that the attribute value of the first virtual object is less than a threshold and the second virtual object exists within a predetermined range near the first virtual object, a prop control corresponding to the target virtual prop on the interface of the virtual environment.

6. The method according to claim 1, further comprising:
    determining, based on the target attribute value restoration delay within the preset period of time in which the attribute value restoration delay of the first virtual object is determined as the target attribute value restoration delay, that the first virtual object enters the restoration state.

7. The method according to claim 1, wherein a time length identified by the target attribute value restoration delay is 0.

8. The method according to claim 1, wherein the skill restoration prop is further configured to improve a restoration speed of the attribute value; and after the equipping the first virtual object with a skill restoration prop in response to a selection operation on the skill restoration prop, the method further comprises:
    in response to that the first virtual object is located in a target stronghold in the virtual environment, controlling, according to the skill restoration prop, the first virtual object to automatically restore the attribute value at a first restoration speed, wherein the target stronghold belongs to a camp of the first virtual object; and
    in response to that the first virtual object is located in a region other than the target stronghold, controlling the first virtual object to automatically restore the attribute value at a second restoration speed, wherein the second restoration speed is lower than the first restoration speed.

9. The method according to claim 8, further comprising: displaying a location identifier of the target stronghold in an image of the virtual environment in response to that the attribute value of the first virtual object is less than a threshold and the target stronghold is located within a line of sight of the first virtual object.

10. The method according to claim 6, wherein after the determining, based on the target attribute value restoration delay within the preset period of time in which the attribute value restoration delay of the first virtual object is determined as the target attribute value restoration delay, that the first virtual object enters the restoration state, the method further comprises:
controlling, in response to a decrease in the attribute value of the first virtual object within the preset period of time, the first virtual object to exit from the restoration state; controlling, in response to that the attribute value does not decrease again within the target attribute value restoration delay, the first virtual object to enter the restoration state again;
controlling, in response to the decrease in the attribute value of the first virtual object after the preset period of time, the first virtual object to exit from the restoration state; and controlling, in response to that the default attribute value restoration delay is reached, the first virtual object to enter the restoration state again.

11. An apparatus for controlling a virtual object to restore an attribute value, the apparatus being a computing terminal and applied to a virtual environment of a game, the virtual environment comprising a first virtual object and a second virtual object, the first virtual object and the second virtual object belonging to different camps in the game, and the apparatus comprising: a processor and a memory, the memory storing at least one instruction and at least one program, code set, or instruction set, and the at least one instruction and the at least one program, code set, or instruction set being loaded and executed by the processor to perform operations comprising:
equipping the first virtual object with a skill restoration prop in the game in response to a selection operation on the skill restoration prop, the skill restoration prop being configured to reduce an attribute value restoration delay, and wherein the attribute value restoration delay indicates that when an attribute value of a virtual object decreases and does not decrease again within the attribute value restoration delay, the virtual object enters a restoration state in which the attribute value is automatically restored;
controlling, in response to a control operation on the first virtual object, the first virtual object to use a virtual prop against the second virtual object, the virtual prop being configured to change an attribute value of the second virtual object; and
determining the attribute value restoration delay of the first virtual object as a target attribute value restoration delay within a preset period of time according to the skill restoration prop in response to that the second virtual object is defeated by the first virtual object with the virtual prop, the target attribute value restoration delay being shorter than a default attribute value restoration delay.

12. The apparatus according to claim 11, wherein the determining an attribute value restoration delay of the first virtual object as a target attribute value restoration delay within a preset period of time according to the skill restoration prop in response to that the second virtual object is defeated by the first virtual object with the virtual prop comprises:
determining the attribute value restoration delay of the first virtual object within the preset period of time as the target attribute value restoration delay according to the skill restoration prop in response to that the second virtual object is defeated by the first virtual object with the virtual prop and the virtual prop belongs to a target virtual prop;
wherein the target virtual prop comprises at least one of a short-range virtual prop or a throwing virtual prop.

13. The apparatus according to claim 12, wherein the determining the attribute value restoration delay of the first virtual object within the preset period of time as the target attribute value restoration delay according to the skill restoration prop comprises:
determining the target attribute value restoration delay according to the skill restoration prop and an attack distance of the target virtual prop, wherein the target attribute value restoration delay is positively correlated with the attack distance.

14. The apparatus according to claim 12, wherein before the controlling, in response to a control operation on the first virtual object, the first virtual object to use a virtual prop against the second virtual object, the operations further comprise:
obtaining, in response to that the attribute value of the first virtual object is less than a threshold and the second virtual object exists within a predetermined range near the first virtual object, a virtual prop currently used by the first virtual object;
displaying a virtual prop switching control on an interface of the virtual environment in response to that the virtual prop currently used by the first virtual object is not the target virtual prop; and
switching the virtual prop currently used by the first virtual object to the target virtual prop in response to a triggering operation on the virtual prop switching control.

15. The apparatus according to claim 12, wherein before the controlling, in response to a control operation on the first virtual object, the first virtual object to use a virtual prop against the second virtual object, the operations further comprise:
highlighting, in response to that the attribute value of the first virtual object is less than a threshold and the second virtual object exists within a predetermined range near the first virtual object, a prop control corresponding to the target virtual prop on the interface of the virtual environment.

16. The apparatus according to claim 11, wherein the operations further comprise:
determining, based on the target attribute value restoration delay within the preset period of time in which the attribute value restoration delay of the first virtual object is determined as the target attribute value restoration delay, that the first virtual object enters the restoration state.

17. The apparatus according to claim 11, wherein a time length identified by the target attribute value restoration delay is 0.

18. The apparatus according to claim 11, wherein the skill restoration prop is further configured to improve a restoration speed of the attribute value; and after the equipping the first virtual object with a skill restoration prop in response to a selection operation on the skill restoration prop, the operations further comprise:
- in response to that the first virtual object is located in a target stronghold in the virtual environment, controlling, according to the skill restoration prop, the first virtual object to automatically restore the attribute value at a first restoration speed, wherein the target stronghold belongs to a camp of the first virtual object; and
- in response to that the first virtual object is located in a region other than the target stronghold, controlling the first virtual object to automatically restore the attribute value at a second restoration speed, wherein the second restoration speed is lower than the first restoration speed.

19. The apparatus according to claim 18, wherein the operations further comprise:
- displaying a location identifier of the target stronghold in an image of the virtual environment in response to that the attribute value of the first virtual object is less than a threshold and the target stronghold is located within a line of sight of the first virtual object.

20. A non-transitory computer-readable storage medium, the computer-readable storage medium being configured to store a computer program, and the computer program, when being executed by a processor of a computing terminal, causes the processor to perform:
- equipping a first virtual object with a skill restoration prop in a game in response to a selection operation on the skill restoration prop, the skill restoration prop being configured to reduce an attribute value restoration delay, wherein the attribute value restoration delay indicates that when an attribute value of a virtual object decreases and does not decrease again within the attribute value restoration delay, the virtual object enters a restoration state in which the attribute value is automatically restored, and wherein the first virtual object and a second virtual object belong to different camps in a virtual environment of the game;
- controlling, in response to a control operation on the first virtual object, the first virtual object to use a virtual prop against the second virtual object, the virtual prop being configured to change an attribute value of the second virtual object; and
- determining the attribute value restoration delay of the first virtual object as a target attribute value restoration delay within a preset period of time according to the skill restoration prop in response to that the second virtual object is defeated by the first virtual object with the virtual prop, the target attribute value restoration delay being shorter than a default attribute value restoration delay.

* * * * *